Figure 1:
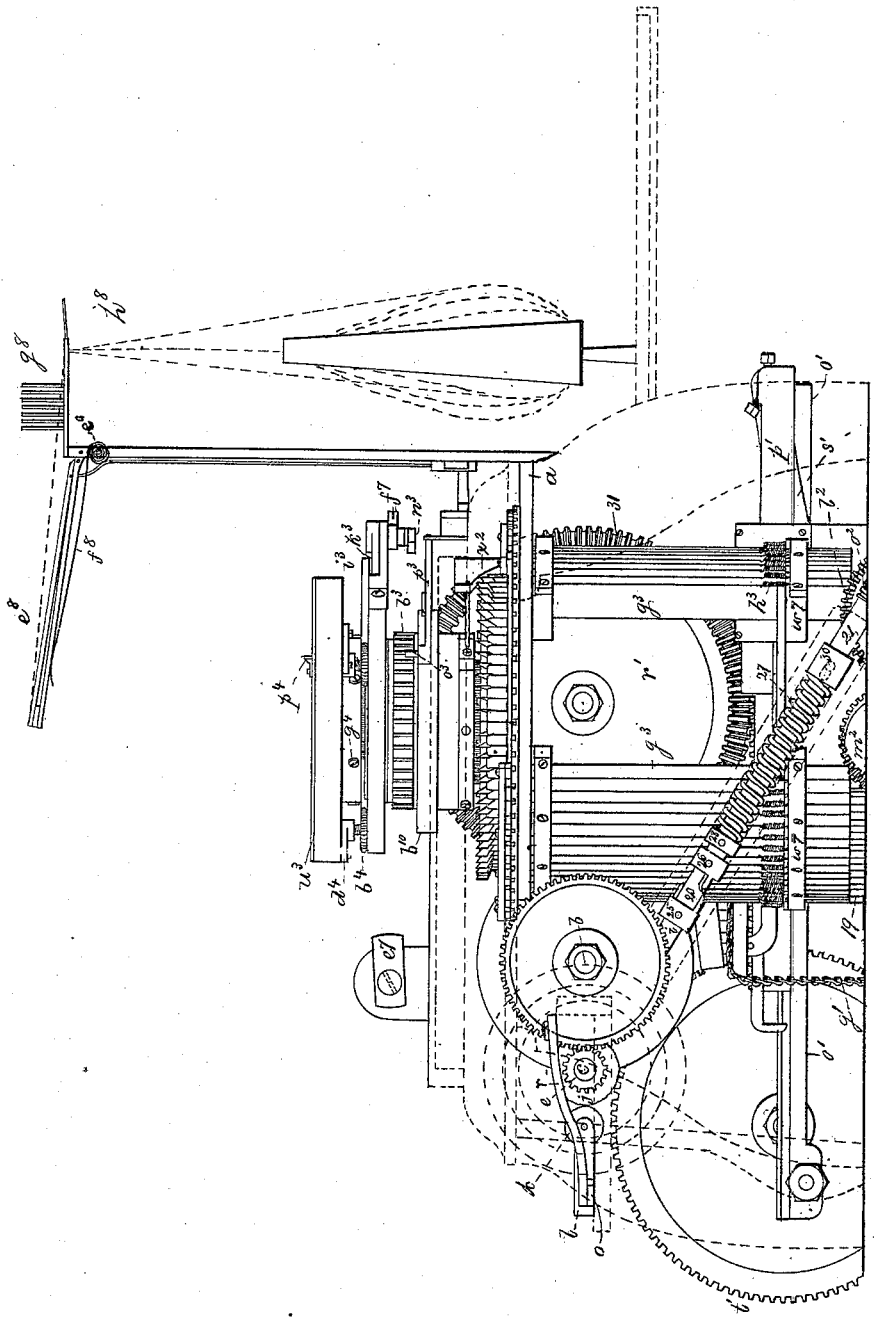

B. F. SHAW.
Circular Knitting-Machine.

No. 228,480. Patented June 8, 1880.

Witnesses
L. F. Connor.
N. E. Whitney.

Inventor
Benjamin F. Shaw.
by Crosby & Gregory
Attys.

B. F. SHAW.
Circular Knitting-Machine.

No. 228,480. Patented June 8, 1880.

Witnesses
L. F. Connor.
N. E. Whitney.

Inventor
Benjamin F. Shaw
by Crosby Gregory Attys

B. F. SHAW.
Circular Knitting-Machine.

No. 228,480. Patented June 8, 1880.

Witnesses

Inventor.
Benjamin F. Shaw
by Crosby & Gregory
Attys

B. F. SHAW.
Circular Knitting-Machine.
No. 228,480. Patented June 8, 1880.
16 Sheets—Sheet 5.
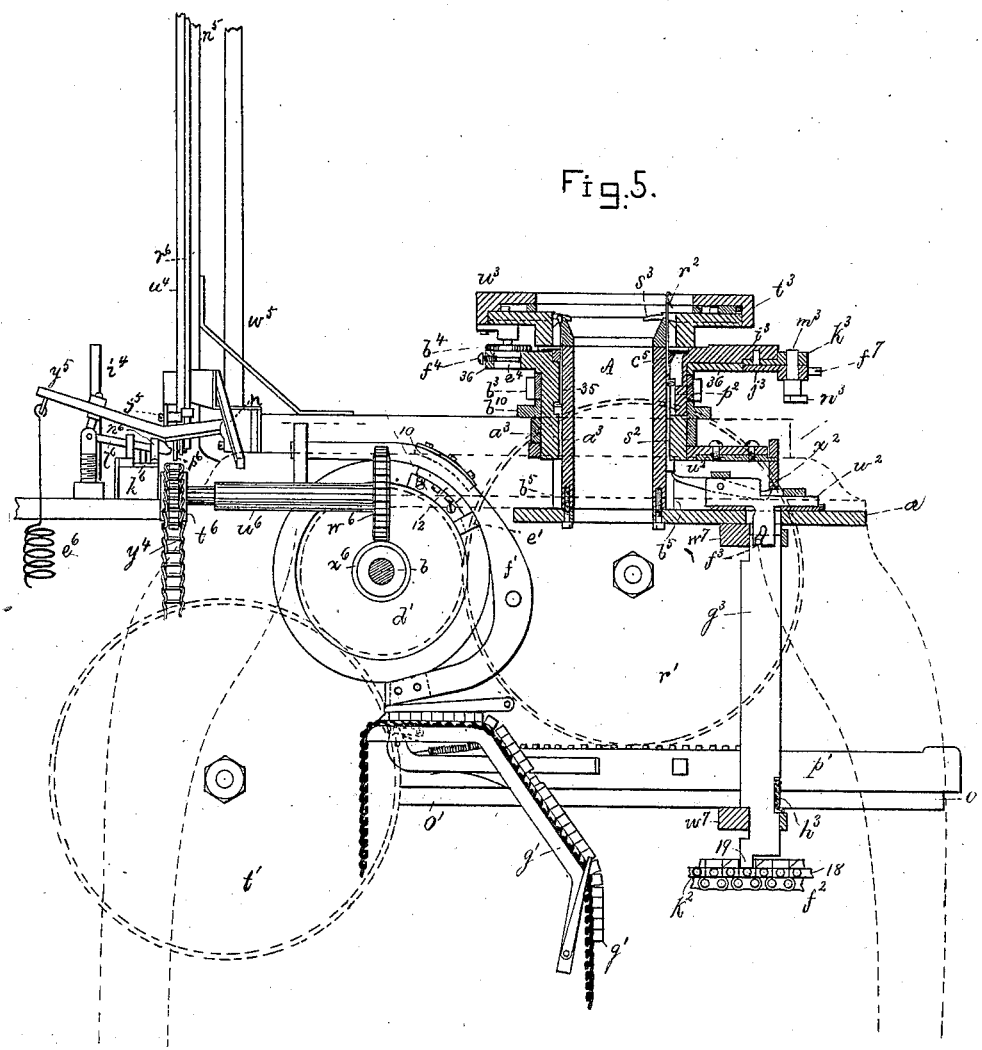
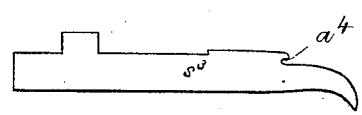
Fig.40.
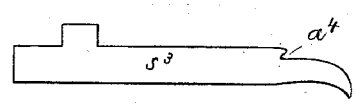
Fig.37.
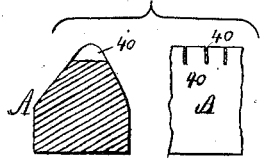

B. F. SHAW.
Circular Knitting-Machine.
No. 228,480.
16 Sheets—Sheet 6.
Patented June 8, 1880.
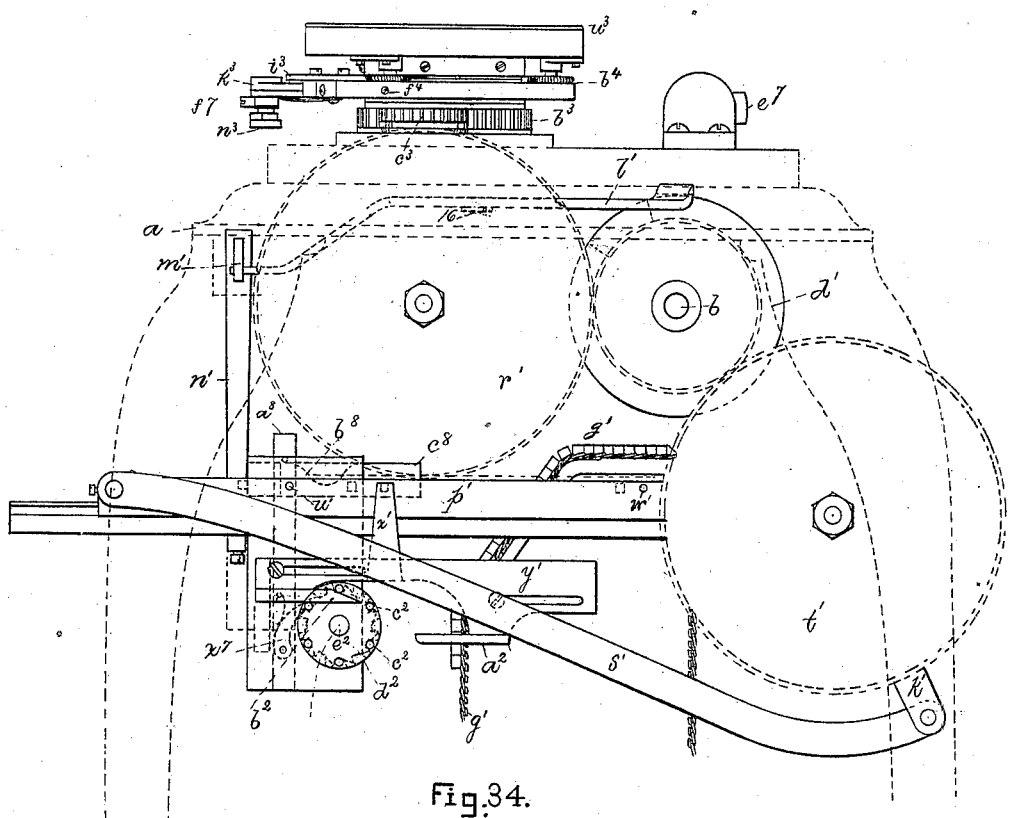
Fig. 6.
Fig. 34.
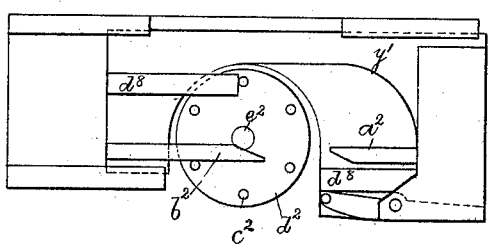
Fig. 35.
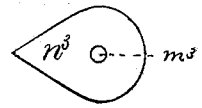
Witnesses-
L. F. Connor.
N. E. Whitney.
Inventor-
Benjamin F. Shaw,
by Crosby & Gregory, Attys 16 Sheets—Sheet 7.

B. F. SHAW.
Circular Knitting-Machine.

No. 228,480. Patented June 8, 1880.

Witnesses
L. F. Connor.
N. E. Whitney.

Inventor
Benjamin F. Shaw
by Crosby & Gregory Attys

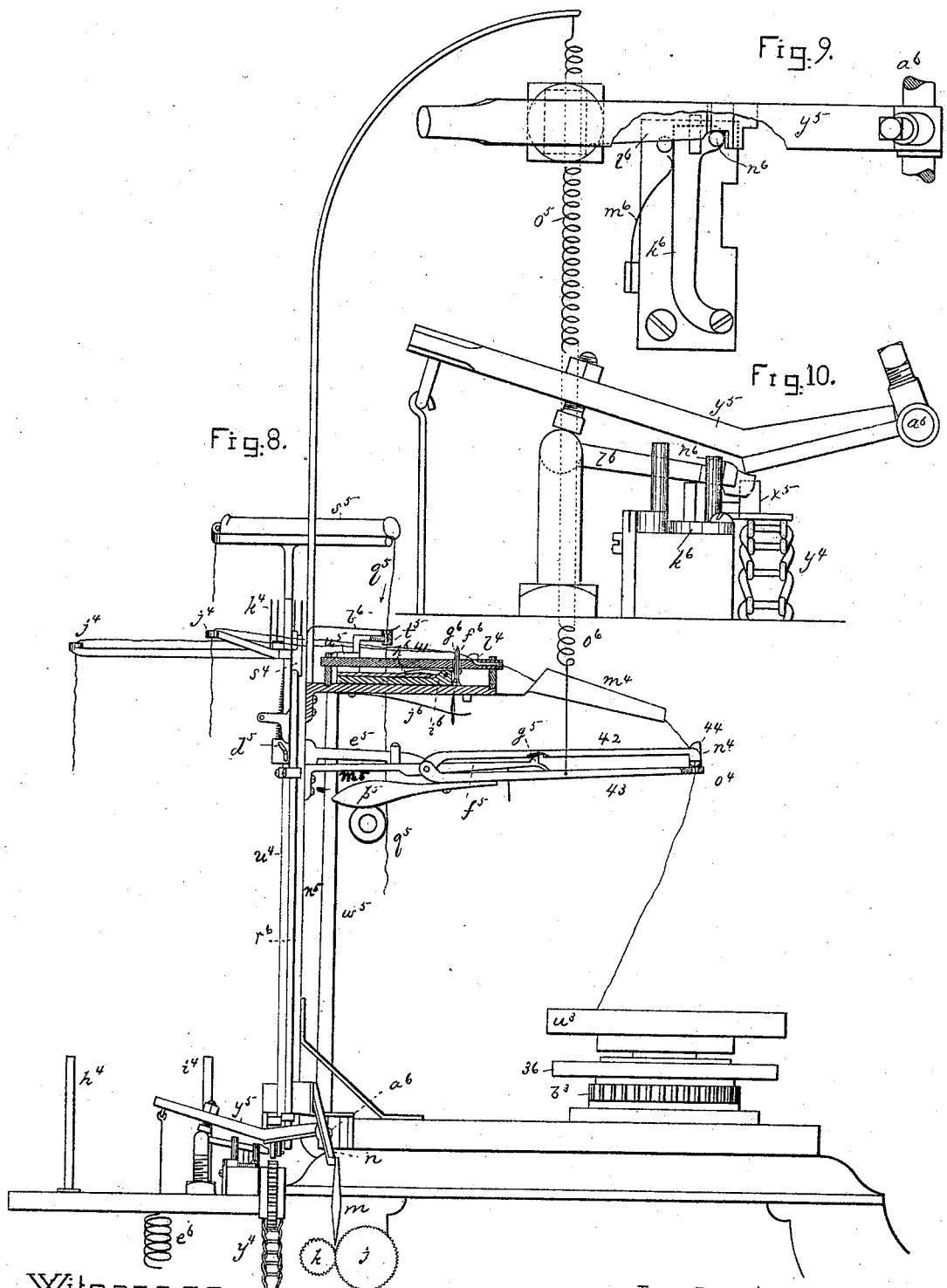

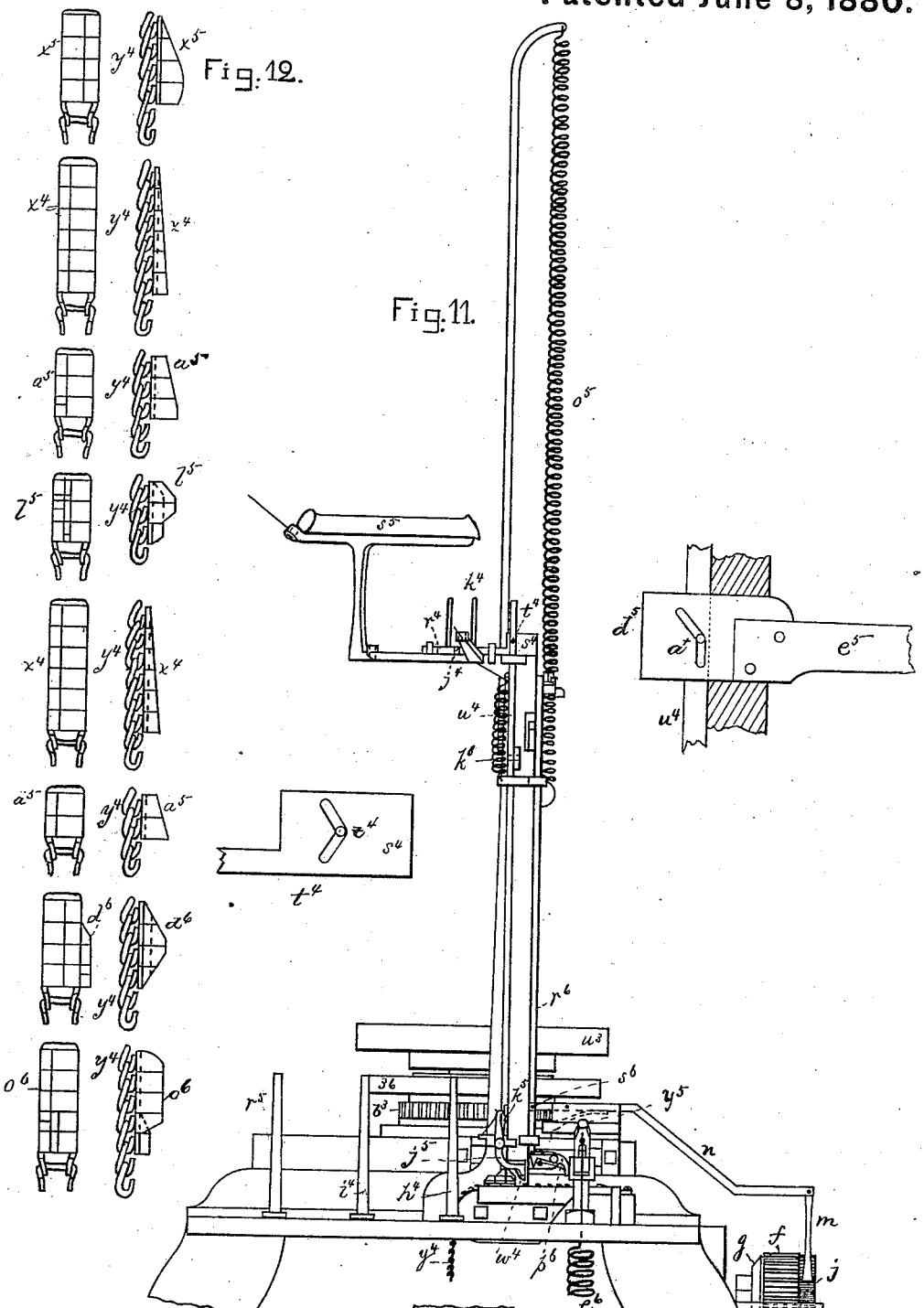

16 Sheets—Sheet 10.

B. F. SHAW.
Circular Knitting-Machine.

No. 228,480. Patented June 8, 1880.

Witnesses
L. F. Connor
N. E. Whitney

Inventor
Benjamin F. Shaw,
by Crosby Gregory Attys

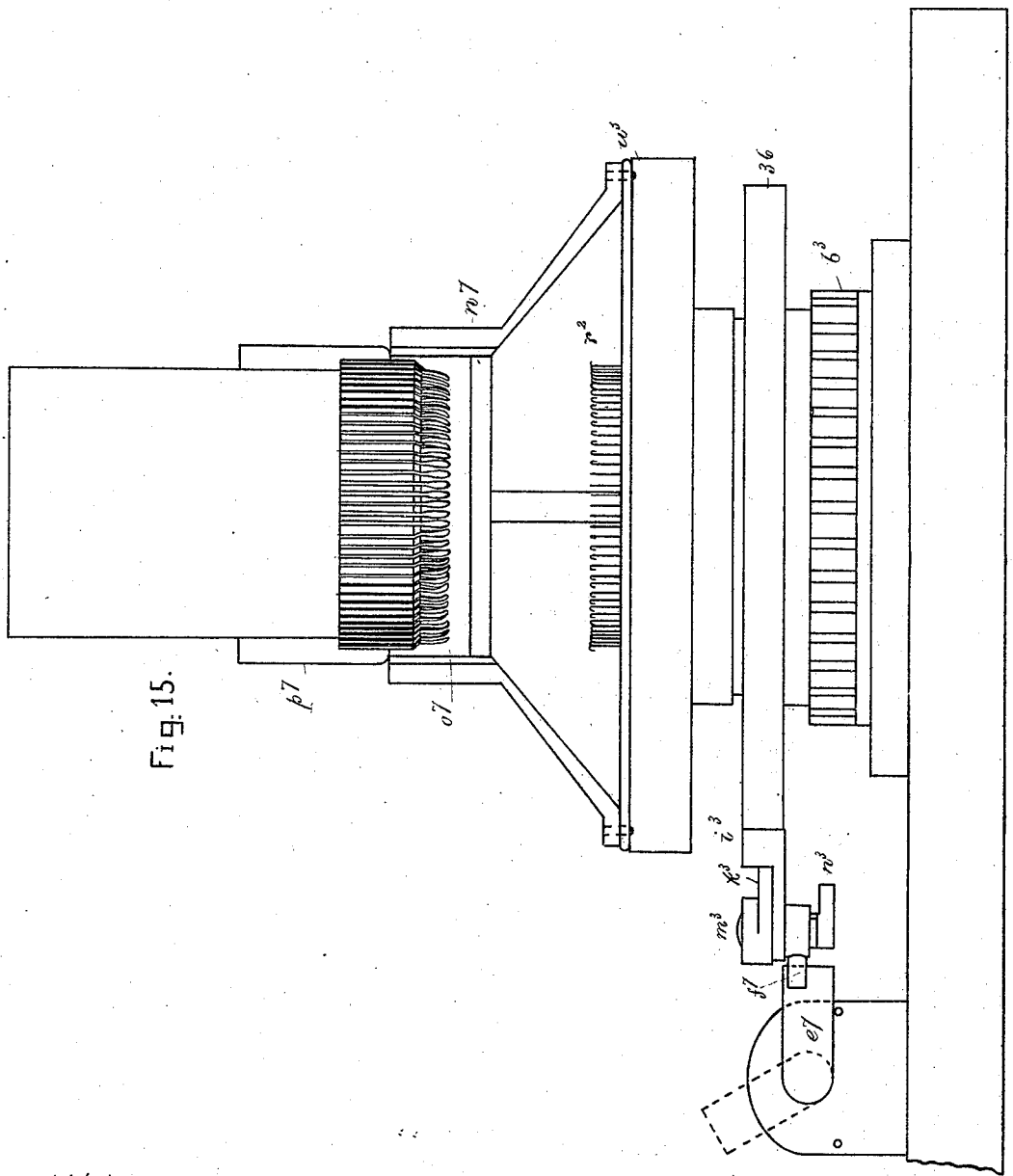

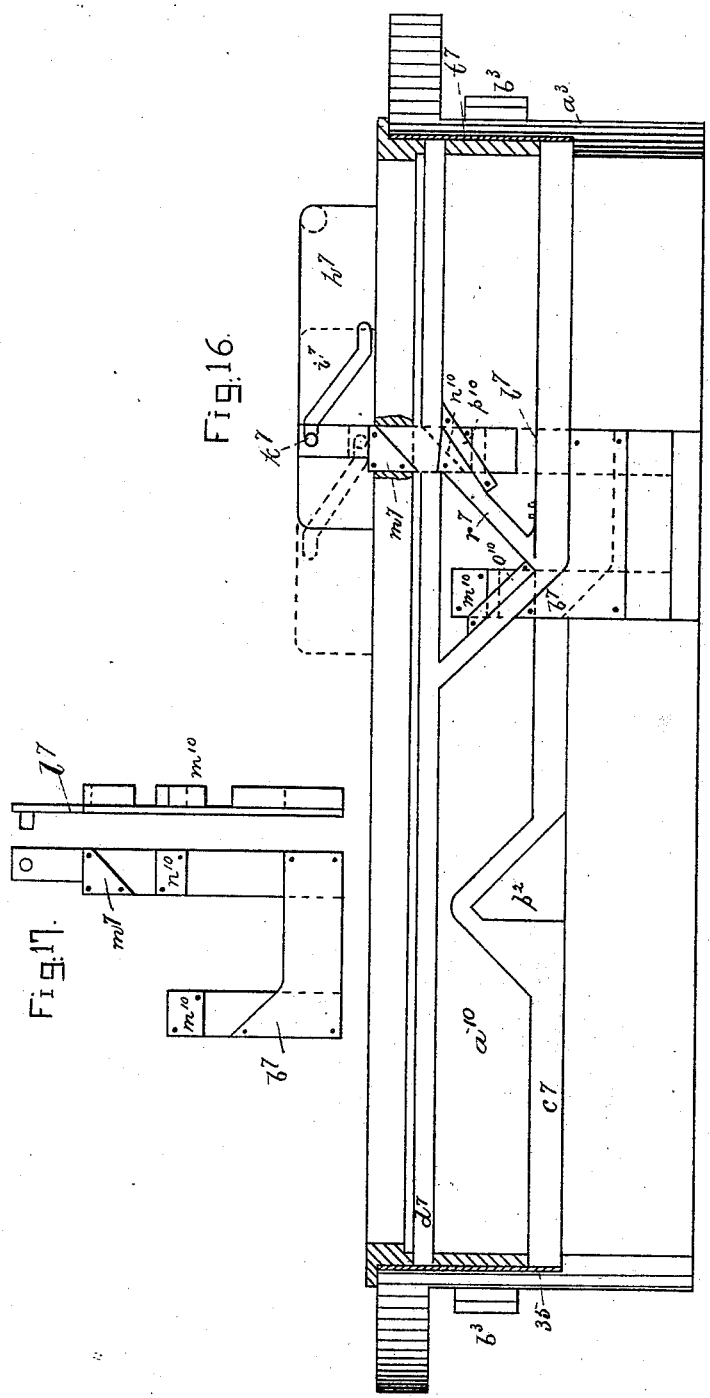

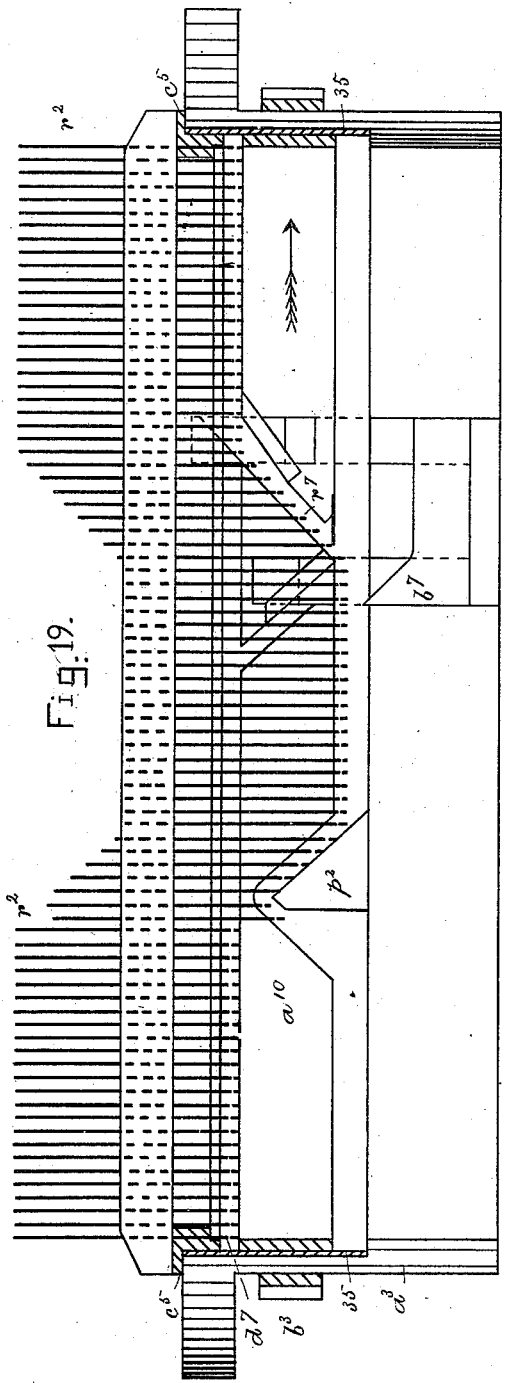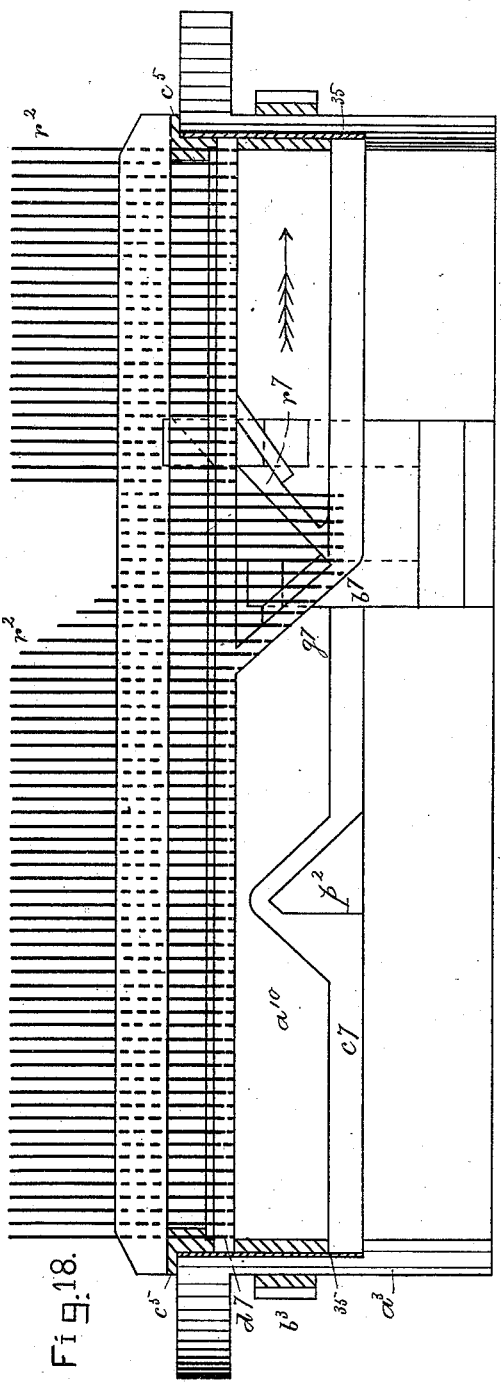

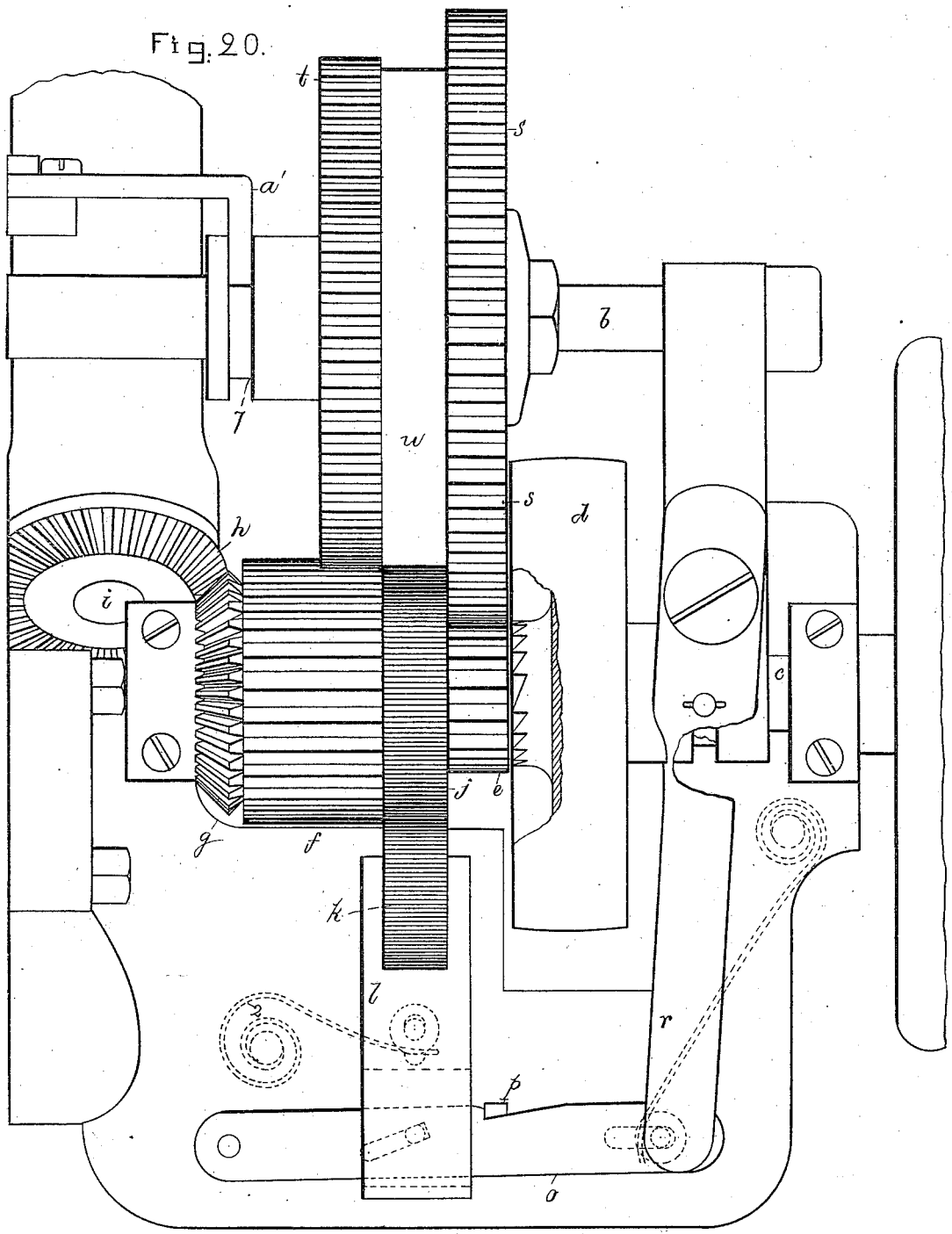

16 Sheets—Sheet 15.
B. F. SHAW.
Circular Knitting-Machine.
No. 228,480. Patented June 8, 1880.
Fig. 21.
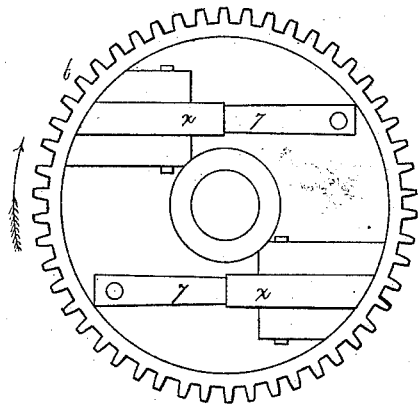
Fig. 22.
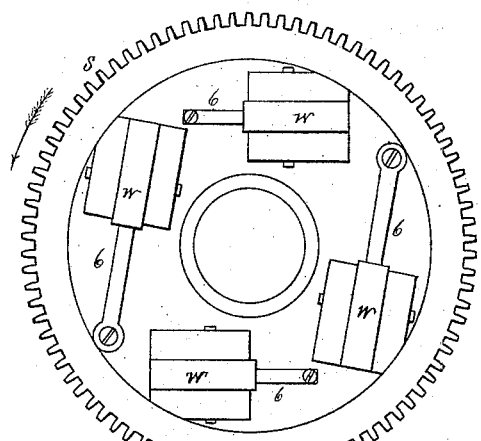
Fig. 23.
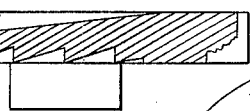
Fig. 24.
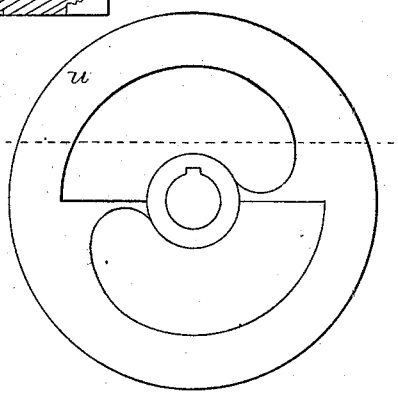
Fig. 25.
Fig. 26.
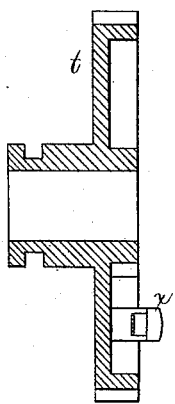
Fig. 27.
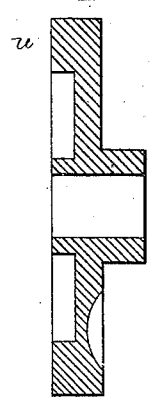
Fig. 28.
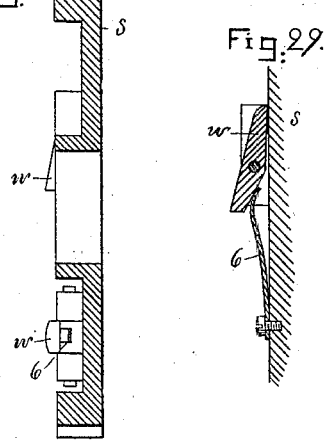
Fig. 29.
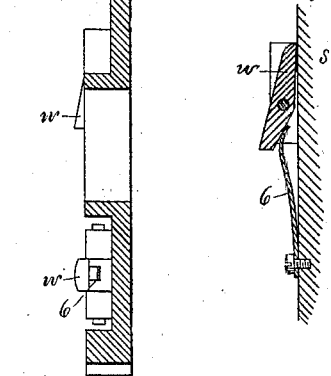
Witnesses.
L. F. Connor.
N. E. Whitney.
Inventor.
Benjamin F. Shaw
by Crosby Gregory Attys

B. F. SHAW.
Circular Knitting-Machine.
No. 228,480. Patented June 8, 1880.
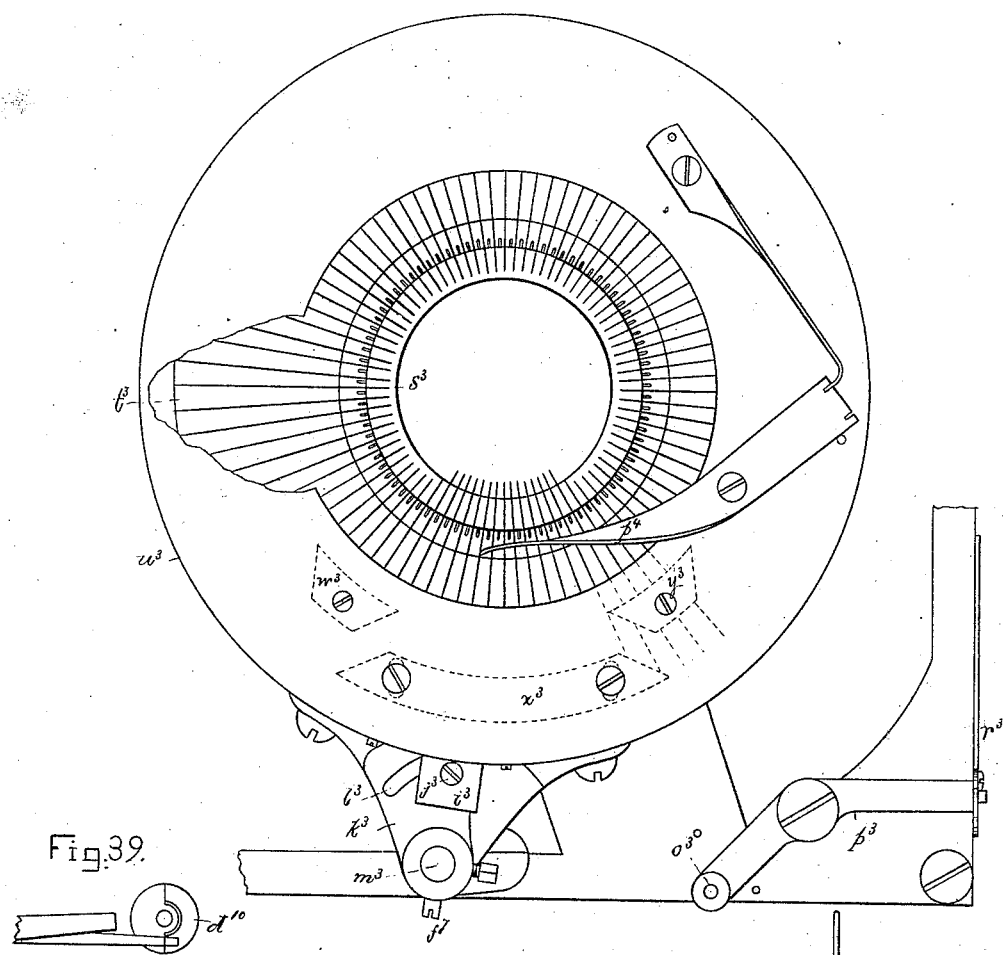
Witnesses
L. F. Connor
A. E. Whitney
Inventor.
Benjamin F. Shaw
by Crosby & Gregory
Attys

UNITED STATES PATENT OFFICE.

BENJAMIN F. SHAW, OF LOWELL, MASSACHUSETTS.

CIRCULAR-KNITTING MACHINE.

SPECIFICATION forming part of Letters Patent No. 228,480, dated June 8, 1880.

Application filed March 7, 1879.

*To all whom it may concern:*

Be it known that I, BENJ. F. SHAW, of Lowell, county of Middlesex, State of Massachusetts, have invented an Improvement in Circular-Knitting Machines, of which the following description, in connection with the accompanying drawings, is a specification.

This invention relates to knitting-machines, and is an improvement upon the machine described in an application for patent originally filed by me in the United States Patent Office October 10, 1876, and renewed March 7, 1879, to which reference may be had.

In this machine the jacquard (shown located below the table and knitting-cylinder) is composed of two chains made up of bars linked together and provided with pattern lags or indicators of different lengths, the lags being provided with inclines to raise the slides and throw out of position the levers which, when in position, serve to raise the fashioning-needles.

This present machine contains a device to continuously store up or accumulate power during the operation of the jacquard, the said power being periodically exerted for the easy and intermittent motion of the jacquard chain or surface.

This machine also contains an escapement to prevent the passage at one time of more than one bar of the jacquard-chain.

I have also introduced in this machine mechanism for changing its speed, the said mechanism acting to reduce the speed for the reciprocating knitting, and then to return to high speed for rotary knitting, whereby the machine is made to accomplish more work with less breakage.

In this my invention the main knitting-threads, before passing into the regular thread-guide, which delivers the knitting-threads directly into the hooks of the needles, are led into an eye made at the side of another thread-guide, and into the space between the main threads and this latter thread-guide a thread-guide mounted on a carriage and operated by a pattern surface or chain is caused to present a thickening-thread carried by it, so that the main running-threads pick up and unite with them the said thickening-thread and carry it automatically through the eye of the regular thread-guide and deliver it to the needles.

At the proper time, as indicated by the pattern-surface, the thickening-thread carriage with its thread is withdrawn, and the said thread is automatically severed, thereby discontinuing the introduction of the said thread into the web. This same pattern-chain is made instrumental in throwing into or out of operation the take-up devices employed during reciprocating knitting.

My invention further consists in a cam-ring provided with a knitting-path, and with a topping-path above it to receive and positively hold all the needles of the machine in elevated position, combined with two switch-cams and a single slide-bar, to which both cams are attached, one of the switch-cams operating from below one and the other from below the other path, and mechanism, substantially as hereinafter described, to move the said slide and its switch-cams, as hereinafter set forth.

Figure 2:
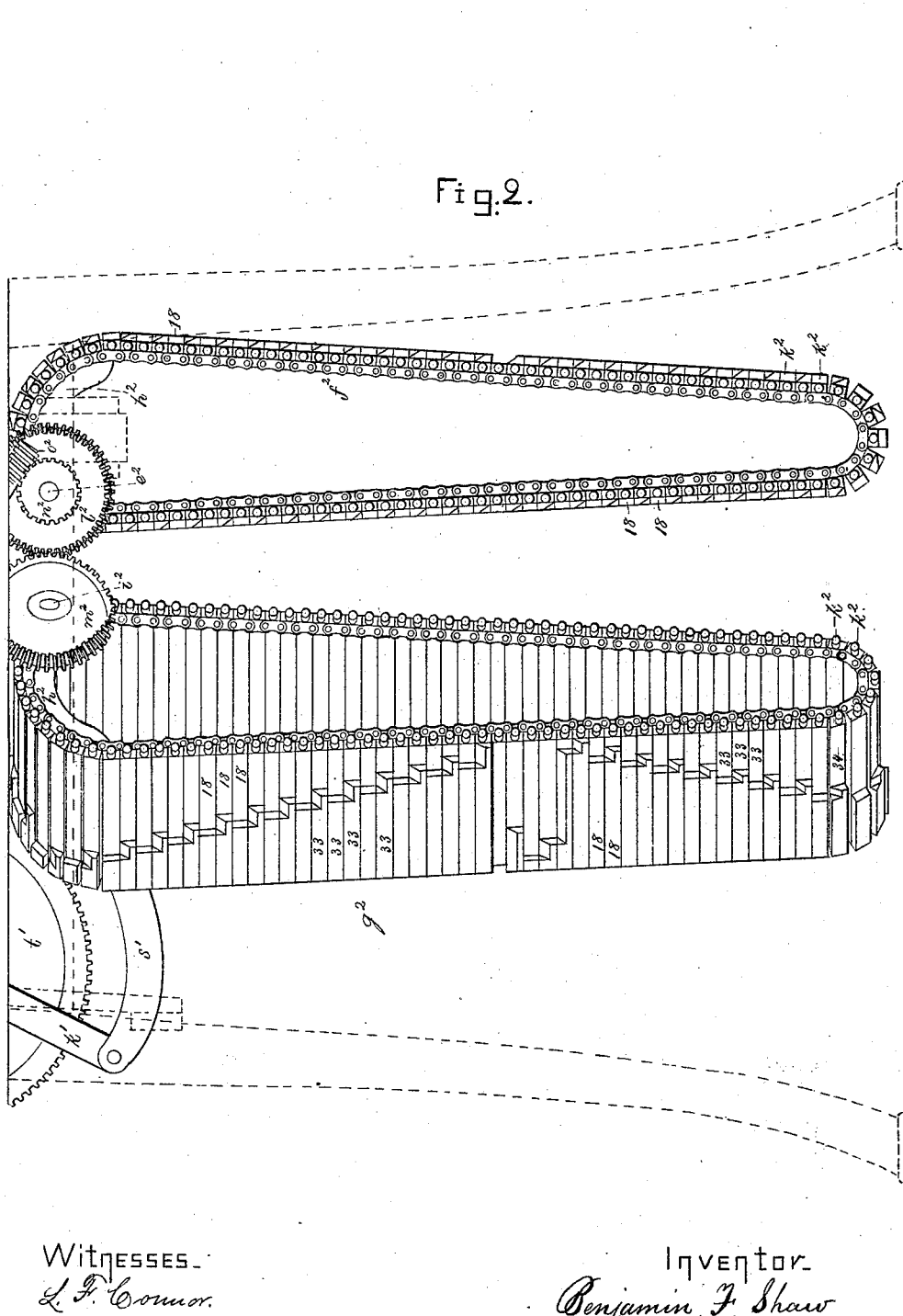
Figure 3:
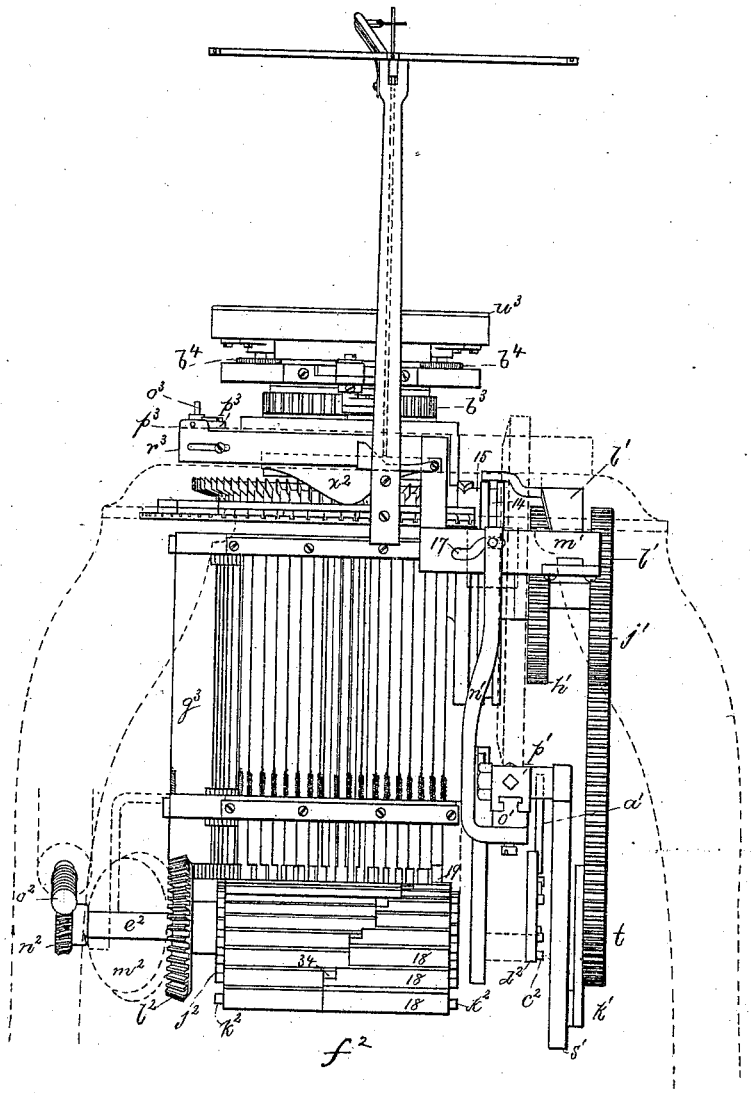
Figure 4:
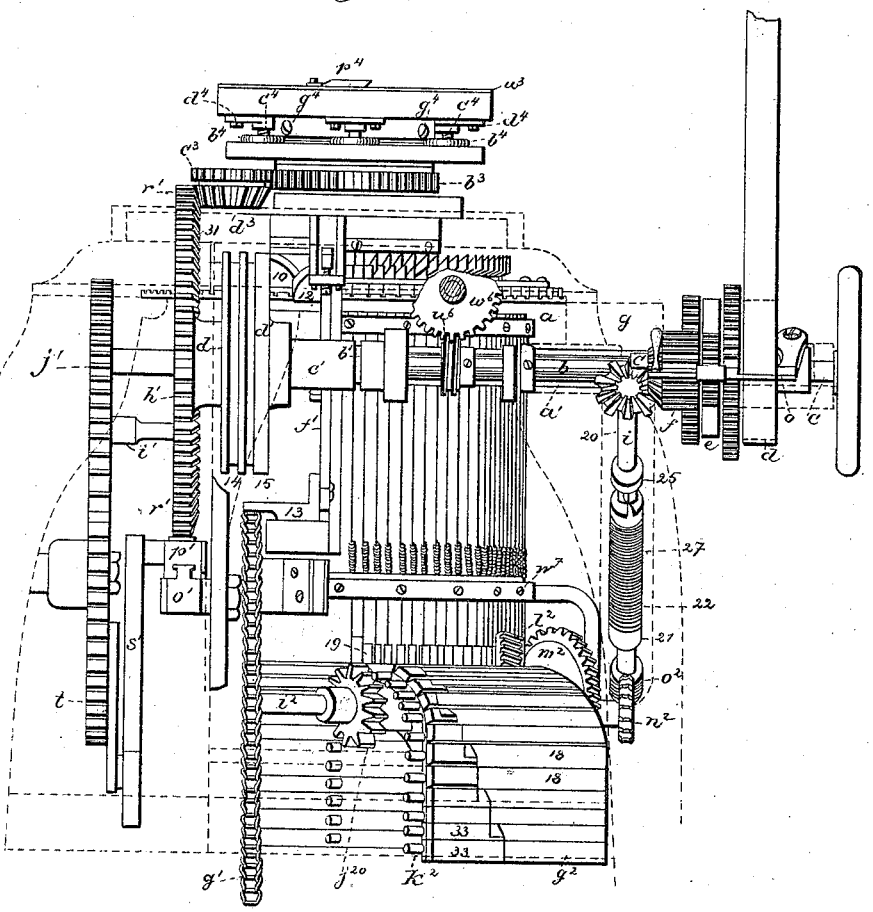
Figure 36:
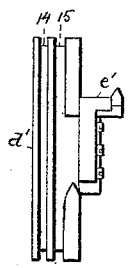
Figure 32:
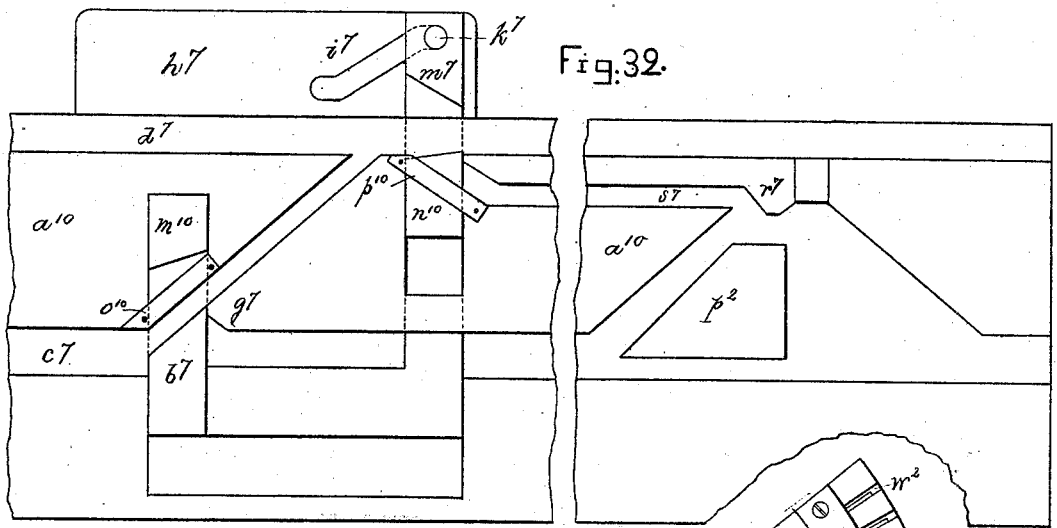
Figure 7:
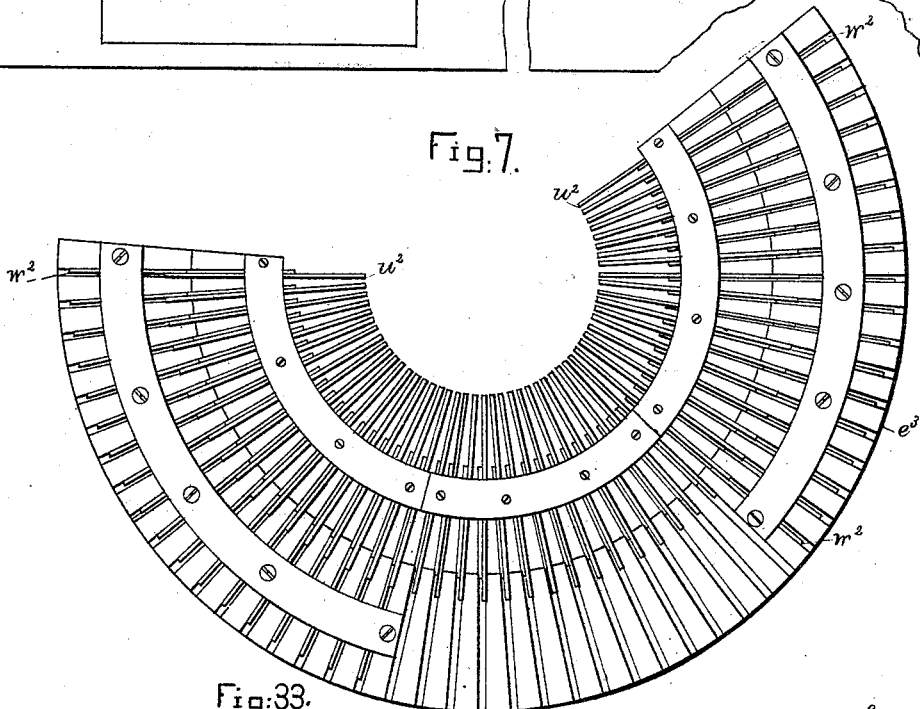
Figure 33:
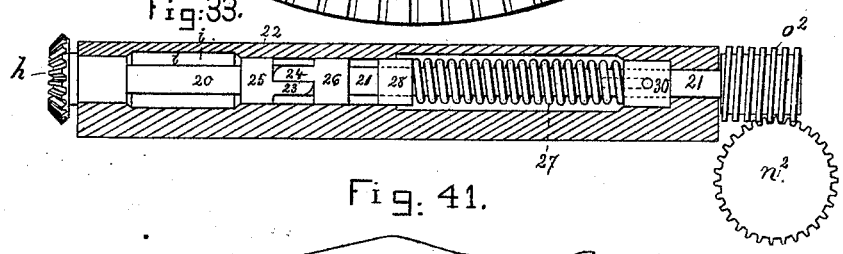
Figure 41:
Figure 13:
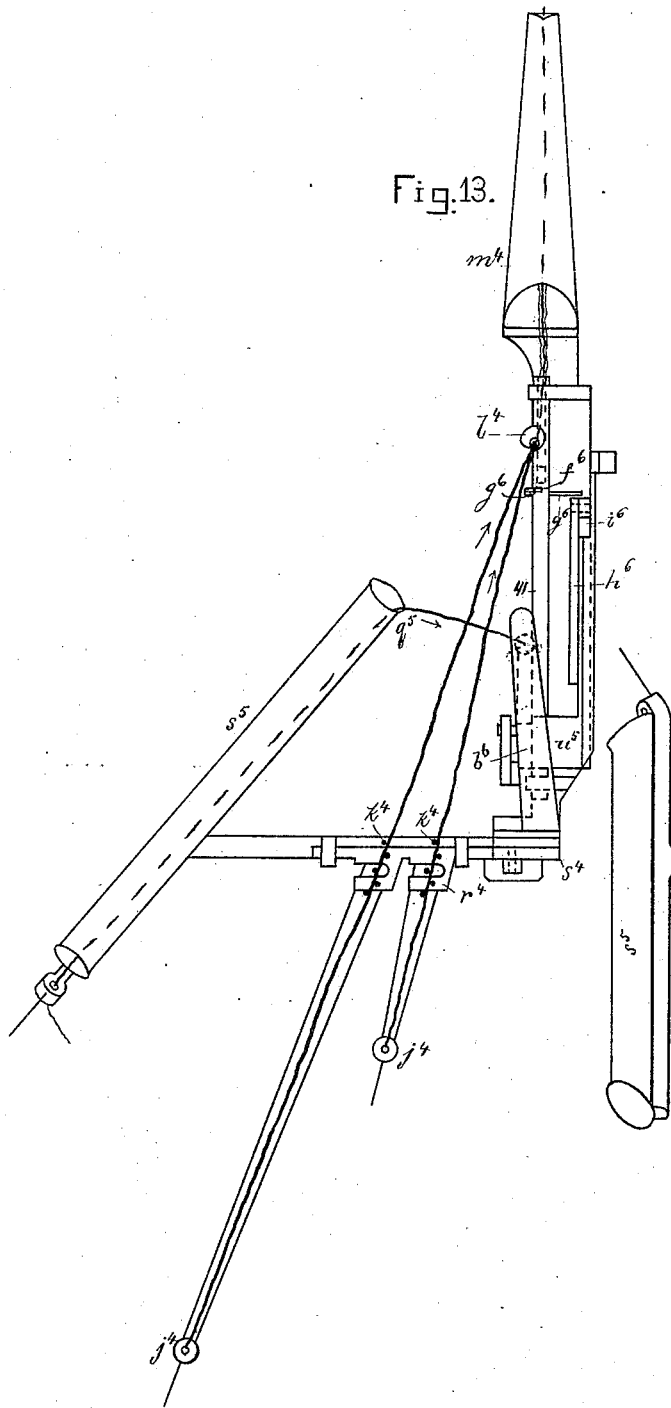
Figure 14:
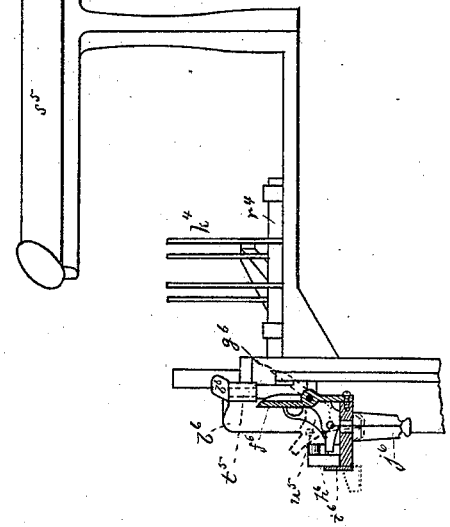

Figure 1 represents, in elevation, the upper portion of the front side of a machine embodying this my present invention, the frame-work therein, as in some other figures, being shown as transparent, the jacquard-chain being omitted; and the said figure also shows an auxiliary thread-guide, such as it is proposed at times to employ upon the legs and feet of stockings when it is desired to make the heels and toes from yarn of a different color. In this figure the main thread-guide and the driving-pulley are omitted. Fig. 2 is a view of the lower part of the same front side of the machine, it and Fig. 1 making a complete view of that side. Fig. 3 is a view of the right-hand end of the machine, a part of the jacquard being omitted, the figure also showing the auxiliary but not the main thread-guide. Fig. 4 is a left-hand end view of parts of the machine, a part of the jacquard and both thread-guides being omitted. Fig. 5 is a sectional view, looking from the front side of the machine, the view showing the needles and web-holders in their beds and means for connecting and actuating the fashioning-needles from the jacquard, and below the said figure are two web-holders, many parts shown in other figures being wholly or partially broken away. Fig. 6 is a rear-side elevation of Fig. 1 with all the thread-guides omitted and with various parts broken away, the gear-wheels in it, as in some other figures, being shown by dotted lines; Fig. 7, a top view of the lever-bed which holds the levers, and levers and carriages for lifting or selecting the fashioning-needles. Fig. 8 is a front-side elevation of the top of the machine, showing the main yarn-guide in position, together with the devices for the automatic introduction and withdrawal of the additional thread for thickening the heels and toes and the take-up. Figs. 9 and 10 are details of locking mechanism to operate when the additional thread is being employed. Fig. 11 is a left-hand end elevation of Fig. 8 and some additional parts of the machine. Fig. 12 represents details of the various cams on the pattern-chain for controlling the tension of the main thread, the action of the take-up, and the introduction and withdrawal of the additional yarn or thread; Fig. 13, a top view of the main thread-guide, its tension devices, and the additional thread device; Fig. 14, a partial view of Fig. 13, taken from the right-hand end of the machine, it representing particularly the cutting-off or severing devices for the additional thread. Fig. 15 represents a transferrer, such as invented by me and described in another application for Letters Patent, originally filed April 30, 1877, and renewed March 7, 1879, the said transferrer being applied to the machine. Fig. 16 represents the interior of one-half of the upper part of the cam-ring, it showing the switch-cams and working-cam without needles in position. Fig. 17 represents the switch-cams and the bar which carries them removed from the cam-ring; Figs. 18 and 19, views to illustrate the operation of the switch-cams to raise the needles out of their knitting-path and to return them therein. Fig. 20 represents an enlarged top view of the speed-changing mechanism; Figs. 21 to 29, inclusive, details of some of the different parts shown in Fig. 20; Fig. 30, a top view of the cam-ring which actuates the web-holders; Fig. 31, a modification of the cam for drawing back the web-holders; Fig. 32, an enlarged detail of a modification of the cam-ring and switch-cams to raise and lower the needles when a ribbed top or cuff is to be applied. Fig. 33 is an enlarged detail or section of the power-accumulating shaft or devices. Fig. 34 is a modification of the escapement for the jacquard-shaft. Fig. 35 is a view of the pointed heart-shaped cam, to be referred to. Fig. 36 is a detail of the grooved disk and its projecting finger. Fig. 37 shows one of the sliding bits upon which the needles rest. Fig. 38 is a top view of the end of the upper jaw of the take-up; Fig. 39, a modification of Fig. 38; Fig. 40, details of the grooved top of the needle-bed; and Fig. 41 represents one of the needle-levers detached.

The frame of the machine (shown in several of the figures as transparent) is of suitable shape to sustain the working parts, the knitting-cylinder A, Fig. 5, being mostly above the main bed-plate $a$ of the machine, while the devices for reciprocating and rotating the knitting devices are placed below the plate.

The main shaft $b$ is driven from a short driving-shaft, $c$, provided with a loose pulley, $d$, (see enlarged view, Fig. 20,) having at its side clutch-teeth of usual construction, to engage clutch-teeth fixed to the said shaft. This shaft $c$ has fixed upon it a gear, $e$, which is the driving-gear during the slow motion, or while reciprocating knitting is being done; also, an elongated gear, $f$, of larger diameter, which is the driving-gear for the high speed, or while the circular knitting is being done; and it also has a bevel-gear, $g$, which engages the bevel-gear $h$ on the compound or two-part shaft $i$, to be hereinafter described; and it also has a fluted wheel, $j$, which, in connection with a similar wheel, $k$, pivoted on a movable slide, $l$, held forward by a spring, 2, serves, when the slide is thrown back, to disengage the clutch from the driving-gear, the slide at that time being forced back by the insertion between the two wheels $j$ $k$ of a pendant, $m$, on the lever $n$, (see Fig. 8,) which is moved down between the said fluted wheels, after the completion of each stocking, by means of a suitable projection on the pattern-chain $y^4$. (See Figs. 5, 8, 11, and details, Fig. 12.) The backward movement of the slide $l$ releases a hook-bar, $o$, from a pin, $p$, and permits the lever $r$, acted upon by a suitable spring, to move the driving-pulley $d$ longitudinally on shaft $c$, release the clutch, and stop the machine.

At the end of the main shaft $b$ and engaging gear $e$ is a loose gear, $s$, while a second loose gear, $t$, of less diameter, on the same shaft, engages the teeth of gear $f$. Between the gears $s$ and $t$, and fixed to the main shaft $b$, is a disk, $u$, provided with teeth at each side, (see Figs. 23, 24, 25,) there being more teeth on that side of the disk (see Fig. 24) next the slow driving-gear $s$ than on the other side, (see Fig. 25,) next gear $t$, the number being increased to make quicker the re-engagement of the dogs $w$ at the inner face of the gear $s$ with the disk $u$. (See Fig. 24.) Other dogs, $x$, in gear $t$ engage teeth at the other side of the disk. (See Fig. 25.) The dogs $w$ $x$ are held pressed outward by means of springs 6 7. When the larger gear $f$ on shaft $c$ drives gear $t$ so that its dogs $x$ engage the teeth of the disk $u$, the machine will be driven at its highest speed, and at the same time the dogs $w$ of the gear $s$, driven by the smaller gear $e$, snap over the teeth of the disk $u$, which latter overtakes and passes them.

When gear $t$ is drawn laterally, as hereinafter described, to disengage its dogs $x$ from the disk $u$, the machine slows down for an instant, thereby permitting the dogs $w$ in gear $s$ to overtake the teeth in the disk $u$, whereupon the machine is driven at a slower rate of speed through the smaller gear $e$ on the said shaft $c$, the gear $t$ then traveling faster than the disk $u$ without affecting it.

The gear $t$ has a groove, 7, in its hub, (see

Fig. 20,) which is engaged by a bar, $a'$, its other end engaging with a groove, $b'$, of a sleeve, $c'$, Fig. 4, so that when the said sleeve is moved longitudinally upon the shaft $b$ the gear is thrown into or out of connection with the disk $a$. This sleeve $c'$ has upon it a disk, $d'$, provided at its side (see Figs. 4 and 5 and detail, Fig. 36) with a cam-projection or stud, $e'$, which is adapted to engage the oppositely-inclined cams 10 12 on the shifting-lever $f'$, having a finger, 13, which at the proper time is lifted or rocked by a projection upon the pattern-chain $g'$.

When the incline 12 is in position to be operated upon by the stud $e'$ the sleeve will be drawn in a direction away from the driving-gears, and will disengage gear $t$ and reduce speed, the opposite motion of the sleeve, by cam 10, increasing speed, as before described. Upon the end of this sleeve $c'$ is fixed a spur-gear, $h'$, which receives its rotary motion through a pin, $i'$, fixed to the pinion $j'$, which pinion is fixed to the main shaft $b$, the said pin being loosely fitted into a hole in the gear $h'$. The disk $d'$ also has two peripherical grooves, 14 15.

The groove 14 engages one end of lever $l$, pivoted at 16, (see Figs. 3 and 6,) and said lever, at its other end, engages a slide, $m'$, provided with a cam-slot, 17, which acts to lift a rod, $n'$, that elevates the rack-bar $o'$, so as to engage the teeth of the rack $p'$, which, as in my application first referred to, will at its upper side be provided with teeth from end to end, the teeth of the rack, as it is slid upon the bar, engaging with the toothed gear $r'$, which gear in function and purpose is the same as the toothed gear 9 in my former application, said gear being herein employed to drive the cam-ring during its reciprocations and rotations.

The rack $p'$ is like that shown in my other application, but in these drawings most of its teeth are omitted. This rack is driven by a link, $s'$, from a suitable crank, $k'$, on the gear $t'$, and when this rack is lifted into engagement with the gear $r'$ two pins or projections, $u'$ $w'$, at the outer side of the rack $p'$ (see Fig. 6) are placed in position to strike the upper end of a finger, $x'$, on and to operate the escapement-slide $y'$, which, suitably held so as to be reciprocated in a right line, has two fingers, $a^2$ $b^2$, that operate to permit the passage between them at each reciprocation of the escapement-slide of only one pin, $c^2$, of the escapement-wheel $d^2$, which is fixed at the end of the shaft $e^2$, through which motion is given to the jacquard-surfaces.

The jacquard herein shown is composed of two chains, $f^2$ $g^2$, moved simultaneously for like distances, and each chain is supported by means of a chain-bed, $h^2$, having a flat top or surface to thereby hold and maintain a number of the independent bars 18 of each chain in one plane, (see Fig. 5,) whereby the operative surface of the bars are held sufficiently close together when acting upon the feet 19 of the jacquard-slides $g^3$, as shown in Fig. 5, to prevent said feed from falling between them. These chains are moved by means of toothed wheels $j^2$ $j^{20}$, fixed upon the shafts $c^2$ $i^2$, which have teeth to engage the projecting ends $k^2$ of the bars 18 of the jacquard, formed for that purpose. These two shafts $e^2$ $i^2$ are connected by means of bevel-toothed gears $l^2$ $m^2$. (See Fig. 2.)

The shaft $e^2$ has upon it a worm-toothed gear, $n^2$, which is engaged by a worm, $o^2$, which gives to the said shaft intermittent motion during reciprocating knitting, the said shaft being held stationary by the fingers $a^2$ $b^2$ of the escapement-slide during the time rotary knitting is taking place. This worm $o^2$ is placed at the end of the power-accumulating shaft $i$, made in two parts, 20 21, and contained, preferably, in a chambered tube, 22, (represented by dotted lines, Figs. 1 and 4, and in section in Fig. 33,) the said tube containing bearings for the said shaft. The upper portion, 20, of this shaft $i$ has upon it the bevel-toothed gear $h$, as before described, which is always in rotation so long as the shaft $c$ is rotated.

The adjacent ends of the two parts 20 21 of the shaft $i$ have fingers 23 24 projecting from collars 25 26, which, when held in engagement by the spring 27, will cause the two parts of the shaft $i$ to revolve together and rotate the worm $o^2$.

To illustrate the operation of this power-accumulating shaft or device, it will be supposed that the machine is knitting the circular part of its web, and the piece 21 of the shaft $i$ within the tube 22, or its bearings, with the spring 27, expanded to its fullest extent. In a working machine a shaft, $i$, of this construction, and under the described conditions, will, at the end of four and three-quarter revolutions of the worm, cause the clutch to be drawn out of engagement by means of the worm $o^2$ acting upon the worm-gear $n^2$ at a time when it is held stationary by the escapement mechanism, which then stops the revolution of the part 21, while the part 20 continues to revolve. This retraction of the part 21 of the shaft $i$ has compressed the spring 27 and stored up in it enough expansive power to move the jacquard chains or surfaces when it shall subsequently be permitted to move by the action of the escapement. In this compressed state the spring 27 is ready to act.

Now it will be supposed the circular knitting to have been completed and the rack $p'$ lifted into engagement with gear $r'$ for reciprocating knitting. The first movement of the escapement-slide permits the passage of one pin $c^2$ of the escapement-wheel $d^2$, whereupon the spring 27 expands, throwing into engagement the clutch of the said shaft $i$, when the worm is again revolved, and at the end of four revolutions thereof another pin $c^2$ passes the escapement-slide, permitting the spring 27 to again expand and move the chain or jacquard, and so on to the end of reciprocating knitting. At this last point the rack is lowered, and the escapement-wheel and pins hold the shaft $c^2$ fixed, and the worm is again drawn out to its fullest extent, disengaging the clutch and leaving the part 21 of the shaft $i$ and its worm $o^2$ stationary.

It will be observed in constructing the clutch that the length of the fingers and the adjustment of the parts should be such as in operating the machine to cause the fingers of one part of the clutch to be thrown into the cavity of the other part upon each re-engagement of the clutch, after completing circular knitting, for reciprocating knitting, it being also observed that during any given number of consecutive reciprocating motions the clutch does not become disengaged, but remains operative, it being completely disengaged only just after reciprocating knitting and during circular knitting.

The length of the clutch and the construction of the worm and worm-gear should be such that four revolutions of the worm will cause it to be retracted the same distance that it will be required to be thrown back by the spring 27 to effect the length of movement required of the jacquard chain or surface.

The collar 28, (see Figs. 1 and 33,) pinned upon the part 21 of the shaft $i$, may be placed thereon at any desired position to give the needed tension to the spring 27 to start with. The collar 30 has a working fit upon the part 21, and a pin on the collar is extended through a slot in the said part 21, (see dotted lines,) the said slot being long enough to permit the maximum longitudinal motion of the part 21. The collar 30 has a bearing at its lower end and sides, and it, together with the spring 27, revolves with the part 21.

The power-accumulating device operates quickly and powerfully to turn the heavy jacquard-chain step by step without shock, which would arise if the said movement were effected by a sudden engagement of a pawl and ratchet-teeth.

In this machine I have shown a circular series of needles, of which that number of needles less than half which knit the instep of the stocking are raised by the working-cam $p^3$, which, during reciprocating knitting, as for heels and toes, is withdrawn, as shown in Fig. 5, so as not to strike the butts of the needles $r^3$.

The remainder of the series of needles $r^3$ are each lifted by means of sliding bits $s^3$, (see Fig. 37,) placed within the grooves of the needle-bed A, below the butts of the needles, so as to be acted upon by pivoted levers $u^3$, which in turn are acted upon by the so-called "jacquard-cam" $x^3$, (see Figs. 3 and 5,) which is fixed upon and always moves with the cam-carrying ring $a^3$, (see Figs. 5 and 16,) that has fixed with it a toothed ring, $b^3$, which is engaged and revolved by means of the toothed pinion $c^3$, which has connected with it a bevel-pinion, $d^3$, (see Fig. 4,) which is engaged and rotated and reciprocated by means of the bevel-teeth 31 of the wheel $r'$.

All the levers $u^3$, except a certain number that act at all times to lift the needles which knit the narrowest course of the heel or toe, are pivoted upon sliding carriages $w^2$, which are moved in radial grooves in the lever-bed $e^3$ (see Fig. 7) by means of pins $f^3$ on the jacquard-slides $g^3$, the said pins entering cam-grooves in downward projections from the said carriages, as in Fig. 5. These levers $u^3$, without carriages, are represented at the middle of Fig. 7, and all those with carriages at either end of the said figure.

The needle-bed or cylinder A is made of greater external diameter at bottom than at top, as at $b^5$, (see Fig. 5,) the grooves therein having their bottoms straight and smooth and parallel with the axis of the cylinder. These grooves at their bottoms are of such depth as to more than cover the traverse of the points of the levers $u^3$.

The grooves in the cylinder are for a distance below its top made of such depth as to enable the needles, by the application outside the cylinder of a ring, $e^5$, to be so held that the needles will not tip over in their grooves when raised to have put on them a rib top or cuff. This ring has a loose fit to permit it to revolve around the cylinder A. The sliding bit $s^3$ has its lower end made wide enough to always remain above the end of the lever $u^3$, so as to be suitably engaged by it. The needles which are lifted by the jacquard-cam acting upon levers pivoted to the carriages are by me denominated "fashioning-needles," as they only are controlled by the jacquard.

The jacquard-bars have upon them lags or indicators 33 of different lengths, (see Fig. 2,) which, as the bars containing said lags come uppermost, act upon and lift the feet of the jacquard-slides $g^3$, thereby causing the slides to move forward the carriages $w^2$ so that the outer ends of the levers $u^3$ of the said carriages are placed out of the range of the jacquard-cam $x^3$, and consequently the needles opposite the ends of said levers are not raised, but remain down and inactive, with their loops upon them.

In this machine, in order that the jacquard may effect the selection of needles, it is only necessary that it shall govern the rising of the needles within the cam-ring. In this machine the cam-ring, supported between its ends within an annular bearing-ring, $b^{10}$, has attached to its lower end, below the said bearing, the jacquard-cam, and above it the parts which support the working-cam.

The grooves of the needle-bed which receive the instep-needles, that are never selected by the pattern, will have their lower portions filled by sheet-metal blanks like the bits, Fig. 37, they being, however, about one-eighth of an inch longer. The said blanks act to prevent the too great descent of the needles $r^3$ in their grooves in the bed A.

When the lags of the bars pass from contact with the jacquard-slides springs $h^3$ depress the slides and retain the carriages in such position that the jacquard-cam will strike and operate the levers $u^2$ and actuate the bits $s^2$ and needles at their inner ends, the needles then knitting as usual.

It is preferred to arrange the lags upon the bars of the chains, so that in running out a course of loops one needle or more may be used at the end of the course beyond that needle which will be the first needle in the next succeeding returning course. This is shown in Figs. 2 and 3 by the arrangement of the inclined inner ends, 34, of the lags and spaces back of said ends.

In order to obviate the use of levers to operate one of the series of jacquard-slides, which would be very complicated, I have employed two jacquard chains or surfaces, one for each series of slides $g^3$, and have so placed them and shaped the feet 19 of the slides that two bars may operate simultaneously upon the two series, respectively, of the circularly-arranged slides.

In this my present invention, as in the application originally filed October 10, 1876, and renewed March 7, 1879, and before referred to, the operative apex of the jacquard-cam $x^2$ is in the same radial plane as that of the working-cam $p^2$; but I have so made or placed it that it lifts the butts of the needles $r^2$ a little higher than would the working-cam, thus permitting the introduction and withdrawal of the said working cam without contact with the needle-butts, whether running at full speed or not, as described in the said application, which permits the cams to be changed without stopping the machine.

In this machine, herein described, the working-cam $p^2$ is connected with the slide $i^3$, guided in suitable ways attached to the flanged part or rim 36 of the cam-carrying ring $a^3$. The said slide $i^3$ has a pin, $j^3$, which enters a cam-slot, $l^3$, in a wide arm, $k^3$, (see Fig. 30,) adjustably fixed upon a pivoted stud, $m^3$, having at its lower end a pointed heart-shaped cam, $n^3$, (see Fig. 35,) which, as the cam-carrying frame $a^3$ rotates, is made to impinge against the stud $o^3$ of a lever, $p^3$, pivoted upon the frame, the opposite end of the lever being engaged with an arm, $r^3$, extended laterally from the slide $m'$, previously described, which lifts the rack-bar $o'$, so that when the rack-bar is lifted the stud $o^3$ engages with the inner side of the heart-cam and withdraws or throws the working-cam $p^2$ out of position, and when the slide $m'$ throws the rack-bar $o'$ down the stud $o^3$ engages the outer inclined side of the heart-cam $n^3$ and moves the working-cam $p^2$ into position.

The web-holders $s^3$, Figs. 5 and 30, are, in this application, supported in grooves in the web-holder bed $t^3$, and operate with the needles and web, as do the web-holders in my other application, originally filed October 10, 1876, and renewed March 7, 1879, and yet another, filed May 2, 1877; but in this application the butts of the web-holders project upward rather than downward, so as to be acted upon by cams on a ring, $w^3$, which moves with the cam-carrying ring $a^3$. The cams for actuating these web-holders are shown in Fig. 30 by the letters $w^3$ $x^3$ $y^3$, said cams being held in the proper position so as to give the web-holders the required movement at the right time.

The forward movement required in the web-holder, produced by cam $x^3$, must be such as will draw the loops previously formed over the tops of the web-holders by the descent of the needles each side of the web-holders against the fronts of the needles $r^2$ with sufficient force to enable the points $a^4$ of the web-holders to hold the web in position during the process of knitting, and the web-holders must take effect upon the loops at or before the needles rise, and the web-holders should remain in such advanced position until at or about the time the needle has completed its descent, at which time the web-holder will be moved outwardly by one or the other of the two cams $w^3$ $y^3$, according to the direction in which the machine is knitting. These cams $w^3$ $y^3$ will occupy adjusted positions with reference to the relative time when they will withdraw the web-holders. If they allow the web-holders to retain their most forward position until the needles next them have fully completed their descent, the loops formed will have all the length they ever can derive from having the yarn drawn down over the web-holders, whatever may be their height; but if the web-holders are withdrawn just before the needles have completed their descent a part of the yarn drawn down over the web-holders preparatory to the formation of the loops will pass from the web-holders beyond the notches $a^4$, and part of each loop will be drawn by a needle into the loop which the needle is then forming, instead of taking all the yarn which would be required for the loop from the bobbin, so that closer or finer knitting may be done in the latter mode of operation than in the former mode.

I prefer to hold the cams $w^3$ $y^3$ by means of two adjusting-screws, as shown in Fig. 31.

I have found that I could use two No. 7 cotton yarns by the former mode of operation and two No. 12 cotton yarns by the latter mode of operation, and in each case produce a web which apparently filled the gage of the machine. The larger of these webs from the No. 7 yarn would make a No. 12 stocking, and the smaller web a No. 8 stocking for a boy.

In connection with the adjustment of the web-holder cams to produce this difference in knitting, I have provided means for adjusting the web-holder bed vertically, such means being milled nuts $b^4$, having tapped centers to work upon screws $c^4$, extended downward from lugs $d^4$, fixed upon the under side of the ring $w^3$, which actuates the web-holders, so that the said lugs $d^4$, lifted by the milled nuts, lift the web-holder bed $t^3$. These milled nuts have about their shanks a groove, $e^4$, (see left of Fig. 5,) into which works set-screws $f^4$, to hold them in the desired position.

When once the vertical position of the web-holder bed has been determined, it is secured against any tendency to revolve by set-screws $g^4$. (See Fig. 4.)

To permit the depression of the web-holder bed to the fullest desired extent, the top of the needle-bed A is provided with slots 40 between the needle-grooves, into which sink the under sides of the web-holders, as will be seen in the detail, Fig. 40.

The machine represented in the drawings is adapted to use three threads or yarns, two upon the leg and an additional or thickening yarn or thread running through the heel, foot, and toe. The two main yarns are taken from bobbins on the spindles $h^4 i^4$ through the eyes $j^4 j^4$; thence, between the two series of tension-pins $k^4$, (see Figs. 8 and 13,) into the eye $l^4$ at the side of a rod or thread-guide, 41, made solid from the said eye backward; thence through the tube $m^4$, the eye $n^4$ of the upper jaw, 42, of the take-up, and the eye $o^4$ of the lower jaw, 43, of the take-up; thence through the eye of the thread-guide proper, $p^4$, to the needles, (see Figs. 1 and 30,) the said thread-guide being pivoted upon the ring $u^3$.

When it is desired, as at the ankle and toward the toe, to apply tension to the yarn, certain of the series of tension-pins located upon a movable slide, $r^4$, are moved into line with the permanent pins of the series of pins $k^4$, thereby increasing the friction upon the thread. This slide at its head $s^4$ is provided with a cam-slot having two opposite or $>$-shaped inclines, with which engages a pin, $t^4$, on a slide-bar, $u^4$, having at its lower end an incline or foot, $w^4$, which is acted upon by the projection $x^4$ of the pattern-chain $y^4$. (See Fig. 11 and details near it.) This chain is provided with projections $a^5$, which at the proper time further lift the bar $u^4$, its pin then passing into the upper portion of the $>$-shaped slot, which causes the slide $r^4$ to recede and remove friction from the thread at the tension-pins; and at the same time a pin, $a^\times$, on the said slide $r^4$ is moved vertically within a cam-shaped slot, $d^5$, at the end of a jointed rod, $e^5$, having upon its forward member or tongue, $f^5$, a projection, $g^5$, which, as the tongue is so moved forward, enters a cavity in the under side of the upper jaw, 42, of the take-up provided with the eye $n^4$, and permits the said upper jaw to settle down upon the yarn passing through the eye $o^4$ of the lower jaw, 43. At this time reciprocating knitting begins, and at each motion of the machine the take-up is drawn down by the friction of the yarn passing through it, and at each reverse of the machine the take-up is raised to take up the slack of the yarn by the spring $o^5$.

The weight of the upper jaw and the surfaces coming in contact with the yarn must be adapted to the character of yarn being employed.

During the time the rod $u^4$ was in the position for the application of tension, and in that for putting on the take-up, as described, it was held by means of a dog, $j^5$, one end of which was pressed into proper notches $k^5$ in the bar by means of a spring at its back.

At the end of reciprocating knitting the projection $b^5$ of the pattern-chain $y^4$ strikes the lower end of the pawl $j^5$ and causes its upper end to recede from the notch in the bar and remain out of engagement with the notch until the spring $k^6$ shall have drawn rod $u^4$ down to its lowest position, and the descent of this rod, through the agency of pin $a^\times$, before described, draws back the tongue $f^5$, causing its projection $g^5$ to open the jaws of the take-up and release the yarn.

The two jaws of the take-up are hinged to an arm, $m^5$, projecting from the stand $n^5$. The tongue part $f^5$ has its hinge within the two hinges of the take-up jaws, and it is necessary in constructing these hinges to have their centers coincide when the tongue is in the forward position given to it to bring the take-up into operation, this coincidence of the hinges or joints enabling the take-up to assume any position without causing the tongue to be moved longitudinally, so as to cause its projection to open the jaws while the take-up is at work.

In order that a spring, $o^5$, sufficiently delicate and elastic may be used, a balance, $p^5$, is applied to the jaw 43 of the take-up, the weight of which balance will be greater or less, as may be required.

For the automatic introduction of an additional thread, $q^5$, which is taken from a suitable bobbin on the pin $r^5$, devices are employed which serve to prevent the yarn kinking while at rest, and the current of air which follows the two main threads while they are running into the machine is made available as an aid to the introduction of the said thread. To obviate this kinking the yarn is drawn through a tube, $s^5$, which holds it straight. From this tube the yarn passes through an eye, $t^5$, upon the movable carriage or head $u^5$, which is actuated by means of the arm $w^5$, this arm being moved forward when a projection, $x^5$, of the pattern-chain lifts the arm $y^5$, which projects from the rocker-shaft $a^6$, upon which is fixed the arm $w^5$.

When the yarn $q^5$ is at rest the carriage $u^5$ is in the position shown in Fig. 8, and then the yarn is held in the eye of the carriage by means of the flat yarn-holding spring $b^6$, the free end of the said yarn hanging down between the main yarns, and the side of the rod or tube 41 having the eye $l^4$, into which the said main yarns are passing.

Upon the advance of the loose hanging end of the yarn $q^5$ (by the forward movement of the carriage $u^5$) to the point where the converging tube 41 and the main running threads or yarns meet (see Fig. 13) the said yarn $q^5$ is pressed by the running yarns, seized and drawn with them into the eye $l^4$, and by means of their contact and the current of air drawn into the eye and following the yarn as it is drawn through the tube $m^4$ it is safely carried through the eyes of the take-up jaws, and, with the main yarns, is delivered to the needles of the machine.

The eye $n^4$ of the upper jaw of the take-up is at its outer side provided with a flaring projection, 44, to deflect the air-current and insure the passage through the eye of the end of the additional thread.

When it is desired to stop the running in of the additional thread, a projection, $d^6$, on the pattern-chain $y^4$ unlocks the arm $y^5$ and allows the spring $e^6$ to turn it downward, thereby drawing back the carriage $u^5$.

While the carriage $u^5$ was moved forward the scissors, or a thread-cutter having one fixed blade, $f^6$, and a movable blade, $g^6$, were closed, and a pointed blade-opener, $h^6$, on a bar, $i^6$, projecting from the foot of the carriage $u^5$, passed over the lower arm of the movable member of the cutter, the two blades being held closed, as in full lines, Fig. 14, by means of a spring, $j^6$; but as the carriage is drawn backward the end of the blade-opener $h^6$, suitably beveled for that purpose, passes below the end of the arm of the movable blade, lifts the said arm, and opens the blade, as shown in dotted lines, Fig. 14, in which position the further backward movement of the carriage gradually lowers the yarn $q^5$ between the blades, and as soon as the opener $h^6$ passes from below the arm of the blade the spring $j^6$ operates to close the cutter and sever the said yarn.

It is obvious that the particular devices herein shown for operating the yarn-severing device may be variously modified as to details without departing from my invention, care being taken, however, to operate the cutter quick enough to avoid breaking the yarn.

When the carriage $u^5$ reaches its forward position it is held there by the carriage-locking device, shown as a pivoted arm, $k^6$, (see Fig. 9,) which, when a projection, $x^5$, of the pattern-chain $y^4$ has raised arm $l^6$ so as to lift the arm $y^5$, is, by a spring, $m^6$, swung laterally, so that its pin $n^6$ is moved under the end of the said lever $l^6$ and holds it and arm $y^5$ extended. The parts remain in this position until the part $d^6$ of the chain $y^4$ moves the arm $k^6$ from below arm $l^6$.

Whenever it is desired to stop the machine at any given point, as at the completion of a stocking or for changing the color of the yarn being used, a series of projections, $o^6$, is placed at the proper point on the pattern-chain $y^4$, and these projections being long enough to reach from point to point of the dog $p^6$, pivoted upon the end of rod $r^6$, lift both points, and consequently the fulcrum of the dog, by which means the rod $r^6$ is raised, and a pin, $s^6$, thereon, entering the notched end of lever $n$, causes the pendent end $m$ to descend between the fluted wheels $j$ $k$, as before described. This pattern-chain $y^4$ is moved by a toothed wheel, $t^6$, upon a shaft, $u^6$, provided with a worm-gear, $v^6$, which engages with a worm, $x^6$, upon the main driving-shaft $b$. (See Fig. 5.) This pattern-chain $y^4$, like the other, $g'$, to be hereinafter described, passes around once during the knitting of a stocking; but this chain has a continuous motion, whereas the motion of the other chain, $g'$, is intermittent.

The pattern-chain $g'$ is like that chain shown in the application herein first referred to, and determines the length of the respective parts of the stocking, and effects at the proper time the change of motion from round-about to reciprocating knitting, and vice versa. As in the other application, the indications of the chain limit the number of reciprocating motions for the heel and toe.

The heel-pattern in this present case presents an unbroken series of indications, so that from the beginning to the end of the heel the motions are reciprocating.

In the heel, after the narrowing has been carried on sufficiently, all the needles used in the production of the heel (but not the instep-needles) are brought into action for, say, two courses, after which the widening of the web is effected by beginning with the smaller number of needles used, bringing additional needles upon either side into action, according to the plan of the jacquard-pattern, until all of the fashioning-needles are brought into use. This knitting upon the narrowing and widening needles, after the narrowing is done and before the widening is begun, has the same effect in closing up loose or drawn loops formed upon the edge of the narrowed portions that the method of knitting around the instep, as described in my previous application, would have.

It will be observed, by changes of the pattern-chains and jacquard, that this machine is adapted to knit a great variety of webs.

In the manufacture of hose and under-garments it is customary to apply to them rib tops or cuffs, which are knitted in a topping or ribbed knitting-machine, and one object of this invention is to facilitate the transfer of these parts to other needles than those upon which they were knitted, that other portions of fabrics may be knitted to them. This is herein accomplished in the following manner: In the first place provision is made to bring all the needles up into one plane, that they may all be equally accessible. This is effected by means of a switch-cam, $b^7$, (see Fig. 18,) which is shown in position to move them from the knitting-path $c^7$, in which is placed the working-cam $p^2$, into the topping-path $d^7$ above. To show the operation of this cam, the stop $e^7$, Figs. 6 and 15, is moved forward to come in range with the projection $f^7$ on the cam-carrying ring, which then comes in contact with it and stops the ring. The position of this stop $e^7$ must be such as to bring the point of the switch-cam $b^7$ between the butts of two adjacent needles, so that the last of the needles upon which it acts when changing the switch will have a free passage by the corner $g^7$ of the path $c^7$ into the path $d^7$ above.

Fig. 19 shows the switch-cam $b^7$ down, and Fig. 18 shows it lifted. Supposing the cam as in Fig. 19, the slide $h^7$, Fig. 16, will be moved by hand from the dotted to the full line position in said figure, and a cam-slot, $i^7$, therein, acting upon a pin, $k^7$, of bar $l^7$, (represented in detail in Fig. 17 and in dotted lines, Fig. 16,) lifts the switch-cam $b^7$ to the position shown in Fig. 18. The switch-cam being lifted, the stop $e^7$ is thrown back, and the cam-ring is then revolved until all the needles have been raised into the upper or topping path, $d^7$.

When all the needles are up the stop is replaced and the ring turned against it, as before, in which position the second switch-cam, $m^7$, has its point so located that when depressed for switching down the needles into their knitting-path $c^7$ the said point will enter between the butts of two adjacent needles. The needles being all up, as described, and shown in Fig. 15, the guideway $n^7$, which is made as a frame of suitable size to rest upon the ring $w^3$, is placed and suitably held in position, so that the quills $o^7$ of the transferrer $p^7$ (devices substantially as described in an application originally filed in the United States Patent Office, April 30, 1877, and renewed March 7, 1879, to which reference may be had) will, as the transferrer is depressed, pass behind the needles, the latter passing up the grooves or hollow sides of the quills and seizing the loops thereon. Supposing that these quills have upon them loops of a top or cuff, the downward movement of the quills will pass the loops over the hooks of the needles, to which the top or cuff may be completely transferred, as described in the said application, and then the transferrer is withdrawn and the guide-frame removed, after which the butts of the needles are retransferred into their knitting-path $c^7$, which is effected by moving the slide $h^7$ into the dotted position, Fig. 16, which operation moves the second switch-cam, $m^7$, downward into the dotted position shown in Fig. 19, so that after the stop $e^7$ is lifted the movement of the cam-ring will cause the said second switch-cam to move the needles into the path $r^7$, which leads downward to the path $c^7$.

In this construction, while the needles are descending, the top or cuff is held up by hand and the loops are under the hooks of the needles.

When the cam-ring has been turned so far that the needles begin to descend behind the working-cam $p^2$ some yarn must be introduced through the thread-guide proper, $p^4$, to the needles, to thereby prevent the descending needles from casting off the work. This being done, the ring is still further turned by hand until all the needles have been returned to their knitting-path, after which knitting is resumed.

It will be found that the last six or ten needles to descend will have their top or cuff loops drawn down below the latches of the said needles by the descent of the needles that were first sent down, and consequently such last needles to descend, if their hooks were not supplied with yarn, would cast off their loops as the said needles completed their descent. To prevent these loops so drawn down by the descent of the said first needles from being cast off, a loose end of yarn is passed by hand under the hooks of the said needles last to come down.

It will be noticed in the construction shown in Figs. 18, 19 that there are two inclines for drawing down the needles—one, $r^7$, leading from the topping-path, and the other behind the working-cam $p^2$; and, as above stated, the needles last to be drawn down, because of their loops being slipped below their latches, as described, would cast off their loops unless yarn were introduced by hand, for yarn is delivered automatically to the needles only by the regular thread-guide, which is located opposite the working-cam. To avoid this casting off of the loops from some of the needles, and also the labor of introducing this small piece of yarn, I have modified the machine, as in Fig. 32, so that by throwing the needles down through a path, $s^7$, directly to the working-cam, opposite which is the regular thread-guide, I have only to introduce the regular yarn when the needles begin to descend back of the said working-cam, and this improved construction requires the top or cuff to be pressed down so that its loops pass below the latches before beginning to return the needles to their knitting-path. Slight changes in the shape of the switch-cams will be observed in Fig. 32.

I have deemed it necessary to herein show and describe the topping attachment in order to properly and clearly represent the purposes and operation of other devices; but I do not herein claim the said topping attachment.

In order to present a smooth surface to the outer ends of the butts of the needles, so that the bar $l^7$ and the parts about the working-cam may present no edges to strike the needle-butts, I place within the cam-carrying ring a thin steel ring, 35, and through it are made apertures for the working-cam, and for the switch-cams and other parts connected with bar $l^7$.

Each jacquard-slide $g^3$ has a foot, 19. These slides, it will be observed, are arranged in the arc of a circle below the needle-bed, the circle being of sufficient diameter to permit the teeth of the combs $w^7$, which guide the slides, to have the requisite size and strength. The bars of the jacquard-chain being straight, it is obvious the slides arranged in a circle must have their feet 19 arranged in a straight line, so that all of them, if required, may be acted upon by a single movement of a bar. To do this the feet of the slides are made to coincide with the direct line of the bar then in operative position, it being parallel with the chord of the arc in which the slides are arranged. The jacquard-slides $g^3$, in their lowest position, are sustained just clear of the bars of the jacquard by means of shoulders thereon, which rest upon the top of the lower comb, $w^7$.

To insure the movement of the jacquard-chain in case of the failure of the spring 27, there is fixed to the shaft $e^2$ a ratchet-wheel, (shown in dotted lines, Fig. 6,) which will be actuated by means of a pawl, $x^7$, pivoted upon a slide $a^8$, which is thrown down and raised at each movement of the rack $p'$ during reciprocating knitting by means of a suitable spring, a cam, $b^8$, on a slide, $c^8$, raising the slide $a^8$ as the slide $c^8$ is moved backward by means of pins on the rack-bar.

I have made a modification of the escapement, whereby I have dispensed with the pawl and ratchet just described, such modification being shown in Fig. 34, wherein it will be noticed that the slide of the escapement is provided with pawl-fingers $d^8$, which engage the pins of the escapement-wheel and move it the required distance in case the spring 27 fails to move it or the shaft $e^2$.

The disk $d'$ (see Fig. 36) has two annular grooves. One of its grooves, 14, will be occupied by a permanent pin, to act to hold the disk against accidental lateral movement; but in order that lateral motion may be given to this disk when desired the outer wall of the groove 15 will be cut away for a certain distance at a point which will bring this opening opposite the permanent pin when the lateral movement is to take place, the pin, therefore, alternately operating on either side of the wall.

In Fig. 11 I have shown an auxiliary thread-guide, the arms $e^8$ of which are balanced on a spring, $e^9$, so as to yield upon the passage of knots. It is provided with permanent but not automatic tension-pins $g^8$, to regulate the delivery of the several yarns $h^8$, which are passed through the thread-guides at different angles.

This stand may be used while knitting upon the circular parts of the web when these are required to be of different color from the heels and toes, and, if not needed, may be removed, the yarns then entering the machine from the other sources described.

The cam-ring will, as usual, be provided with a proper groove or needle-gate for the insertion or removal of needles. In the manufacture of the cam-ring it is chambered annularly within it, and in this chamber is placed, first, a thin steel ring, 35, (see Figs. 16 and 18,) and upon and within this ring is secured the drawing-down cam $a^{10}$, made as an annulus. This construction of the cam-ring and cam enables the cam to be readily renewed or repaired, and permits the smooth ring 35 to serve as the outer wall of the groove $c^7$.

In Fig. 38 it will be noticed that the upper jaw of the thread-guide is provided with a safety-projection, $d^{10}$, of sufficient size to prevent the loops which form in tightly-twisted yarn when it is slackened from catching upon the end of the take-up and breaking. In the said figure the safety-projection is shown as a long finger; but I have used to good advantage a circular plate with a central opening, as represented in Fig. 39.

The modified form of escapement shown in Fig. 34 is not herein specifically claimed, as it will form the subject-matter of another application.

The two projections $m^{10}$ $n^{10}$ (see Figs. 16, 17) serve to stop the grooves between the paths $c^7$ $d^7$ at the proper time. These projections run in passages cut for them in the annulus $a^{10}$, and in order to keep or make continuous the inclined surfaces or paths along which the needle-butts pass thin metal strips $o^{10}$ $p^{10}$ are riveted upon the annulus, as described.

The pattern-chain $y^4$, which moves continuously, is the source which indicates the commencement and completion of all the slow-moving parts or motions of the machine—as, for instance, the take-up and tension devices, the additional or thickening thread carriage, and the stopping mechanism; and the chain $g'$, which is moved intermittingly, is the source which indicates the commencement and completion of all the high speeds or motions of the machine, such as the engagement and disengagement of the rack and gear and the change of speed of the machine.

In this machine it will be noticed that I unite the additional or thickening thread to the regular or main knitting-thread as it is passing or being drawn toward the regular thread-guide, the said main thread acting to catch and carry with it the said additional thread through the regular thread-guide and to the needles, the said additional thread not being delivered to a secondary thread-guide, to be by it delivered to the needles, as in some machines for knitting striped or fancy-colored fabrics.

I claim—

1. In a knitting-machine, a series of needles and a series of levers and independent sliding carriages, combined with a jacquard, and slides or intermediate connections between the jacquard and carriages and the levers and needles, to thereby effect the selection of the needles to be operated, substantially as described.

2. In a knitting-machine provided with a circularly-arranged series of reciprocating needles, the cylindrical bed-needles, bit-slides, levers, and movable carriages upon which the levers are mounted, combined with two jacquard chains or surfaces, and with devices between the said jacquard-surfaces and the carriages, to effect the selection of needles at each side of the cylinder, substantially as described.

3. In a knitting-machine, a series of needles, bit-slides, levers, and movable carriages to support the levers, combined with a working-cam to operate upon the butts of some of the needles, and a jacquard-cam to operate upon the series of levers, substantially as described.

4. In a circular-knitting machine, a series of independent carriages combined with a series of independent levers pivoted thereon, an independent carriage for each lever, and mechanism to move the carriages, whereby the levers are placed in or withdrawn from position to be acted upon by their operating-cam, substantially as described.

5. In a knitting-machine, movable carriages and needle-lifting levers thereon combined with devices to move the carriages and a cam to act upon the said levers when the same have been carried into its path, and means for actuating said cam, substantially as described.

6. The combination, in a knitting-machine, of a series of needles, pivoted levers, a working-cam and a cam to act on the levers to lift some of the needles higher than if lifted by the working-cam, to permit the working-cam to be moved into or withdrawn from operative position while the machine is running, and means for actuating the said cams, substantially as described.

7. In a knitting-machine provided with a circularly-arranged series of needles actuated by a cam-ring, a gear to engage and rotate and reciprocate the said ring, combined with mechanism adapted to automatically rotate the said gear and the cam-ring at high speed for round-about knitting, and to reciprocate it at slow speed for to-and-fro knitting, substantially as described.

8. In a knitting-machine, a series of jacquard-slides arranged in the arc of a circle, combined with a jacquard-chain having straight bars provided with projections or pattern-lags, the foot of each slide of the series of slides being situated thereon, substantially as described, to arrange all the feet in a straight line to be acted upon one or all at once by the same bar, substantially as described.

9. The shaft $b$ and its fixed disk provided with teeth upon opposite faces, and two loosely-held toothed wheels of unequal diameter provided with dogs, combined with two fixed pinions of unequal diameters located on a driving-shaft, $c$, and intermeshing with the loose wheels, and means for engaging or disengaging the toothed wheel of least diameter from the said disk, substantially as described.

10. The combination, in a knitting-machine, of a cylindrical needle-bed, a series of circularly-arranged needles, a cam-ring, mechanism to both rotate and reciprocate the cam-ring to actuate the needle, mechanism to rotate the said cam-ring at a high speed and to reciprocate it at a slow speed, and a pattern-chain to automatically effect both the change of direction of motion of the machine and the change of speed, for the purpose set forth.

11. The power-accumulating device, consisting of a two-part shaft, a clutch between them, a pinion upon one part and a worm and spring upon the other part, and the bearings for supporting said shaft, substantially as described.

12. The shaft $e^2$ and escapement mechanism to lock and release it, and a worm-toothed gear, combined with a worm, a two-part shaft, a spring, a clutch between the two parts of the shaft, and a pinion upon one part of the shaft, whereby one part of the shaft in continuous rotation is adapted to rotate the other part, causing the worm thereon in engagement with the stationary worm-gear to move that part of the shaft longitudinally to compress the spring and store up power ready to be exerted to turn the shaft $e^2$ when released by the escapement-fingers, substantially as described.

13. In a knitting-machine provided with a circularly-arranged series of needles and mechanism to both rotate and reciprocate the cam-ring for operating the needles, a pattern-surface to govern the number of said rotations and reciprocations, combined with a pattern-surface and devices controlled thereby, to automatically put the slack-yarn take-up into and out of operation, substantially as and for the purpose described.

14. The pivoted take-up jaws, combined with a movable tongue and means to operate it, as described, to effect the opening of the jaws and to permit them to be closed, substantially as described.

15. The pivoted take-up jaws and their balance, combined with a spring to lift the take-up jaws and means to support them, substantially as described.

16. A pivoted take-up jaw and an attached balance to assist in maintaining it in its position farthest from the needles, combined with a jaw pivoted upon the first-mentioned jaw and adapted to rest upon the thread by its own weight, and means to support them, substantially as described.

17. In a knitting-machine, the combination, with the needles and a guide for the main threads provided with an eye, into which the main threads are led, as described, of a thread-guide and carriage for a thickening-thread, and means to operate the said carriage to place its thread in contact with the running main threads, to automatically unite with the said running main threads before they reach the regular thread-guide next the needles, the additional or thickening thread, and means to discontinue the said thickening-thread at any desired point in the web, substantially as described.

18. The combination, in a knitting-machine, of a carriage for a thickening-thread, mechanism to move the carriage, and a cutting mechanism for the said thread, the carriage being adapted in its forward movement to give its thread to the regular or main knitting-threads while running to the needles, and in its backward movement over the additional or thickening thread to lower or place it in position to be severed by the cutting mechanism, substantially as described.

19. The combination, with tension devices for the main threads, of a pattern-surface and devices to operate said tension devices to apply tension to or remove it from the yarn, substantially as described.

20. The combination, with the carriage or mover for delivering the additional thread to the action of the main threads and devices to move it, of a locking device to hold the carriage forward and a pattern-surface to release it, substantially as described.

21. The combination, with the shaft $e^2$ and its escapement-wheel and the escapement slide and fingers, of the rack-bar provided with projections to operate the escapement-slide and mechanism to operate the rack-bar, substantially as described.

22. The working-cam, the slotted vibrating arm $k^3$ to move it, and the pointed heart-shaped cam, the stud and lever, and connecting devices between the lever and slide to determine the engagement and disengagement of the rack-bar and gear $r'$, combined with the slide, the rack-bar, and gear $r'$, the combination operating to place the working-cam into or out of position with relation to the knitting-path, substantially as described.

23. The needle-bed, made of greater diameter externally at bottom than at top, and grooved as described, combined with the bit-slides, the levers and their carriages, and mechanism to move the carriages and levers longitudinally, to permit the ends of the levers in all their positions to always remain within the said grooves, substantially as described.

24. The internally-chambered cam-ring and its hard sheet-metal lining 35, combined with the annular drawing-down cam within the said sheet-metal lining, substantially as described.

25. The cam-ring and the sheet-metal ring 35, provided with an opening for the working-cam to pass through it, combined with the said working-cam $p^2$ and its carrying-slide, substantially as described.

26. In a knitting-machine, a cam-ring and its support, combined with a jacquard-cam located below a working-cam located above the said support, and mechanism to withdraw and insert the said working-cam at the proper times, substantially as and for the purpose described.

27. In a knitting-machine, the combination, with the series of jacquard-slides and jacquard-surface, of the shaft for moving the jacquard-surface, and the pin-wheel and escapement, and operating mechanism therefor to hold and release it at the proper time, substantially as described.

28. The cam-ring provided with the annulus $a^{10}$, in combination with the switch-cams and the projections $m^{10}$ $n^{10}$, substantially as described.

29. In a knitting-machine, a cam-ring provided with a knitting-path, $c^7$, and with a topping-path above it to receive and positively hold all the needles in elevated position, combined with two switch-cams and one single slide-bar, to which both cams are attached, one of the switch-cams operating from below one and the other from above the other path, and mechanism, substantially as described, to move the said slide and its switch-cams, whereby the butts of all the needles may in succession be transferred from one to the other of the said paths by the turning of the cam-ring, and be prevented from movement out of the topping or upper path except when moved out by the switch-cam, substantially as described.

In testimony whereof I have signed my name to this specification in the presence of two subscribing witnesses.

BENJAMIN F. SHAW.

Witnesses:
J. N. MARSHALL,
WILLARD C. LAMSON.